(12) United States Patent
Ohshio et al.

(10) Patent No.: US 10,584,723 B2
(45) Date of Patent: Mar. 10, 2020

(54) SERVO-VALVE AND FLUIDIC DEVICE

(71) Applicant: NABTESCO CORPORATION, Tokyo (JP)

(72) Inventors: Keitaroh Ohshio, Gifu-ken (JP); Yu Shibata, Gifu-ken (JP); Satoshi Asada, Gifu-ken (JP)

(73) Assignee: NABTESCO CORPORATION, Tokyo (JP)

(*) Notice: Subject to any disclaimer, the term of this patent is extended or adjusted under 35 U.S.C. 154(b) by 164 days.

(21) Appl. No.: 15/633,263

(22) Filed: Jun. 26, 2017

(65) Prior Publication Data
US 2017/0370483 A1    Dec. 28, 2017

(30) Foreign Application Priority Data

Jun. 27, 2016 (JP) ................................ 2016-126962
Jun. 5, 2017 (JP) ................................ 2017-111223

(51) Int. Cl.
*F15B 13/043* (2006.01)
*F16K 31/04* (2006.01)
*F15B 11/08* (2006.01)

(52) U.S. Cl.
CPC .......... *F15B 13/0436* (2013.01); *F16K 31/04* (2013.01); *F15B 11/08* (2013.01)

(58) Field of Classification Search
CPC ....... Y10T 137/86582; Y10T 137/8659; Y10T 137/86606; F15B 13/0436; F15B 13/0438; F15B 9/07; F15B 9/06; F15C 3/12; F15C 3/14; F15C 3/10
USPC ............. 137/625.6, 625.61, 625.63, 83; 91/3
See application file for complete search history.

(56) References Cited

U.S. PATENT DOCUMENTS 2,884,907 A    5/1959    Atchley
3,223,103 A *  12/1965   Trinkler .................... F15C 3/14
                                                            137/83
3,610,267 A *  10/1971   Warren .................... F02K 9/805
                                                            244/3.22

(Continued)

FOREIGN PATENT DOCUMENTS

EP    0662565 A1    7/1995

OTHER PUBLICATIONS

Machine translation of EP0662565, retrieved Feb. 13, 2019, published 1995 (Year: 1995).*

(Continued)

*Primary Examiner* — Michael R Reid
(74) *Attorney, Agent, or Firm* — Cantor Colburn LLP

(57) ABSTRACT

Servo-valve that controls fluid discharged from a nozzle discharge port by displacing the nozzle, and that drives an actuator. The servo-valve includes a receiver provided with a first inflow port into which the fluid discharged from the discharge port flows. At least either the discharge port or the inflow port is a non-circular opening formed such that the amount of change in the area of overlap of the discharge and inflow ports occurring when the nozzle is displaced from the initial position is larger than in cases where the discharge port and the inflow port are of circular form of the same area. The increased amount whereby the area of overlap between the discharge and inflow ports changes when the nozzle is displaced from the initial position lets the fluid flow into the inflow port more quickly, improving the response speed of the actuator.

16 Claims, 14 Drawing Sheets

(56) References Cited

U.S. PATENT DOCUMENTS 3,934,603 A * 1/1976 Avery ................ F15C 3/10
                                                137/83
8,997,624 B1   4/2015 Jansen et al.

OTHER PUBLICATIONS

Extended European Search Report corresponding to Application No. 17177984.6-1754; dated Nov. 28, 2017.

* cited by examiner

FIG. 9A

SECTION (a)

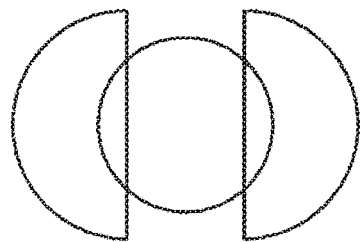

DISCHARGE PORT: CIRCULAR
LEFT INFLOW PORT: SEMI-CIRCULAR
RIGHT INFLOW PORT: SEMI-CIRCULAR

SECTION (b)

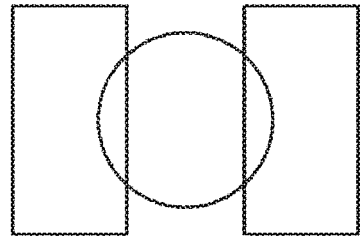

DISCHARGE PORT: CIRCULAR
LEFT INFLOW PORT: RECTANGULAR
RIGHT INFLOW PORT: RECTANGULAR

SECTION (c)

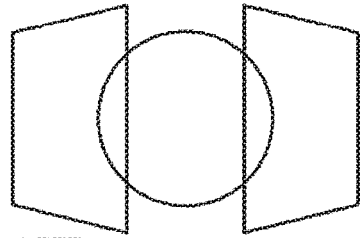

DISCHARGE PORT: CIRCULAR
LEFT INFLOW PORT: TRAPEZOIDAL
RIGHT INFLOW PORT: TRAPEZOIDAL

SECTION (d)

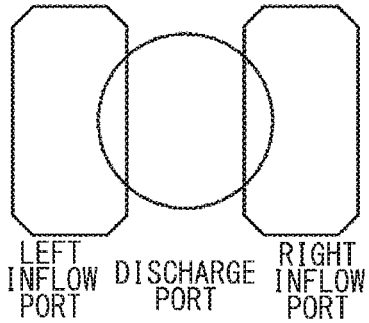

DISCHARGE PORT: CIRCULAR
LEFT INFLOW PORT: OCTAGONAL
RIGHT INFLOW PORT: OCTAGONAL

FIG. 9B

SECTION (a)

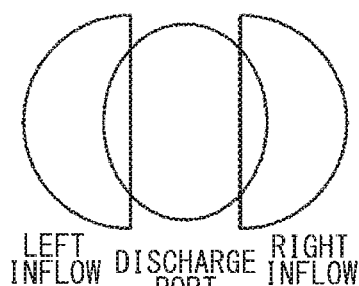

DISCHARGE PORT: OVAL
LEFT INFLOW PORT: SEMI-CIRCULAR
RIGHT INFLOW PORT: SEMI-CIRCULAR

SECTION (b)

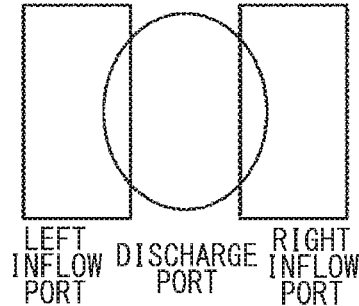

DISCHARGE PORT: OVAL
LEFT INFLOW PORT: RECTANGULAR
RIGHT INFLOW PORT: RECTANGULAR

SECTION (c)

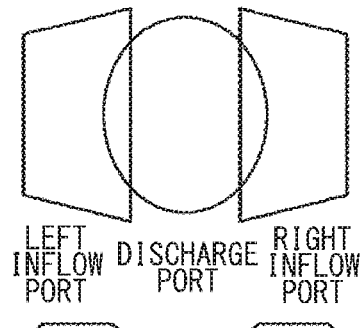

DISCHARGE PORT: OVAL
LEFT INFLOW PORT: TRAPEZOIDAL
RIGHT INFLOW PORT: TRAPEZOIDAL

SECTION (d)

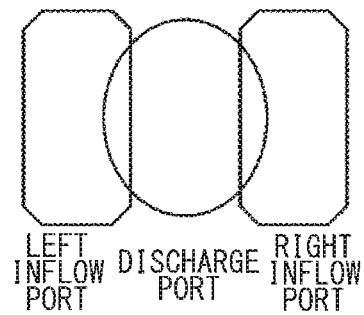

DISCHARGE PORT: OVAL
LEFT INFLOW PORT: OCTAGONAL
RIGHT INFLOW PORT: OCTAGONAL

FIG. 9C
SECTION (a)

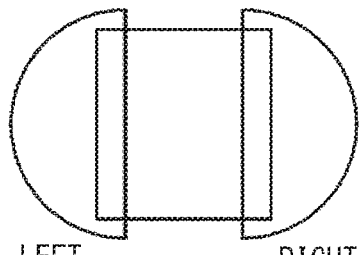

DISCHARGE PORT: RECTANGULAR
LEFT INFLOW PORT: SEMI-CIRCULAR
RIGHT INFLOW PORT: SEMI-CIRCULAR

SECTION (b)

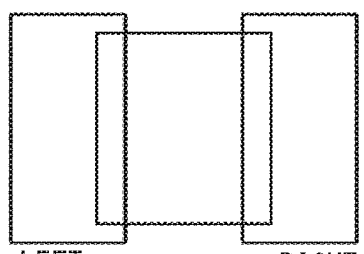

DISCHARGE PORT: RECTANGULAR
LEFT INFLOW PORT: RECTANGULAR
RIGHT INFLOW PORT: RECTANGULAR

SECTION (c)

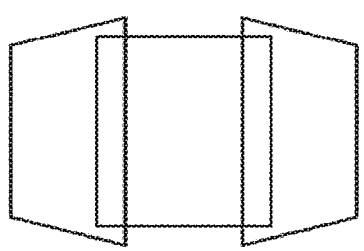

DISCHARGE PORT: RECTANGULAR
LEFT INFLOW PORT: TRAPEZOIDAL
RIGHT INFLOW PORT: TRAPEZOIDAL

SECTION (d)

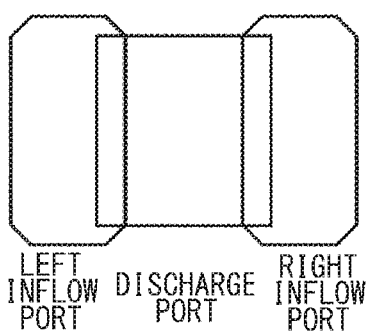

DISCHARGE PORT: RECTANGULAR
LEFT INFLOW PORT: OCTAGONAL
RIGHT INFLOW PORT: OCTAGONAL

FIG. 9D
SECTION (a)

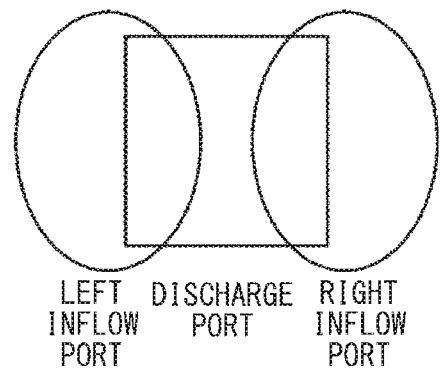

LEFT　DISCHARGE　RIGHT
INFLOW　PORT　　　INFLOW
PORT　　　　　　　　PORT

DISCHARGE PORT: RECTANGULAR
LEFT INFLOW PORT: OVAL
RIGHT INFLOW PORT: OVAL

SECTION (b)

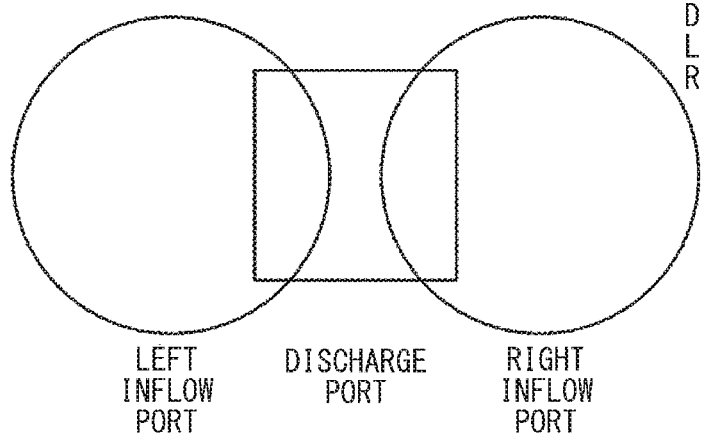

LEFT　　　　DISCHARGE　　RIGHT
INFLOW　　　PORT　　　　　INFLOW
PORT　　　　　　　　　　　　PORT

DISCHARGE PORT: RECTANGULAR
LEFT INFLOW PORT: CIRCULAR
RIGHT INFLOW PORT: CIRCULAR

SECTION (c)

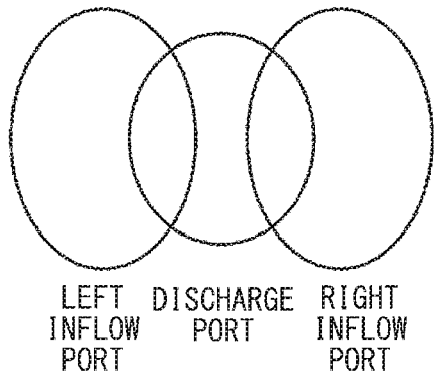

LEFT　DISCHARGE　RIGHT
INFLOW　PORT　　　INFLOW
PORT　　　　　　　　PORT

DISCHARGE PORT: OVAL
LEFT INFLOW PORT: OVAL
RIGHT INFLOW PORT: OVAL

SERVO-VALVE AND FLUIDIC DEVICE

RELATED APPLICATIONS

This application is based upon and claims the benefit of priority from the prior Japanese Patent Application No. 2016-126962, filed on Jun. 27, 2016 and the prior Japanese Patent Application No. 2017-111223, filed on Jun. 5, 2017, the entire content of each of which is incorporated herein by reference.

BACKGROUND OF THE INVENTION

1. Field of the Invention

The present invention relates to a servo-valve and a fluidic device having a high response performance.

2. Description of the Related Art

A servo-valve is used in airplanes or other industrial fields. U.S. Pat. No. 2,884,907 discloses a technique of displacing a nozzle toward left and right sides of a rotation axis based on an electromagnetic principle to adjust the amount of hydraulic oil flowing into two inflow ports formed in a receiver.

A high response speed of the servo-valve results in a high accuracy of a control using the servo-valve. Thus, there have been various attempts for improving a mechanical mechanism and/or an electrical mechanism for driving the nozzle from the past. However, many of these improvements face various problems involving with a selection of a material, a mechanical strength, a complex control, and a manufacturing cost of the servo-valve.

SUMMARY OF THE INVENTION

An object of the invention is to provide a simple technique of giving a high response speed to a servo-valve.

A servo-valve according to an aspect of the invention controls a fluid discharged from a discharge port of a nozzle by displacing the nozzle and drives an actuator. The servo-valve includes a receiver provided with an inflow port into which the fluid discharged from the discharge port flows. At least one of the discharge port and the inflow port is an opening formed in a non-circular form such that the amount of change in the area of overlapping of the discharge port and the inflow port occurring when the nozzle is displaced from the initial position is larger than when the discharge port and the inflow port are formed in circular forms of the same area.

According to the above-described configuration, the change amount of the area of overlapping of the discharge port and the inflow port occurring when the nozzle is displaced from the initial position is larger than that of a case in which the opening is formed in a circular form in the same area. Accordingly, since the fluid can flow into the inflow port in a short time, a response speed of the actuator is improved.

A fluidic device according to another aspect of the invention includes the servo-valve and a movable piece which is displaced by the fluid in a hollow portion communicating with the first outflow port and the second outflow port.

According to the above-described configuration, the fluidic device including the servo-valve can be operated at a high response speed.

BRIEF DESCRIPTION OF THE DRAWINGS

FIG. 9A is a schematic diagram showing illustrative forms of a discharge port and an inflow port (a seventh embodiment).

FIG. 9B is a schematic diagram showing the illustrative forms of the discharge port and the inflow port (a seventh embodiment).

FIG. 9C is a schematic diagram showing the illustrative forms of the discharge port and the inflow port (a seventh embodiment).

FIG. 9D is a schematic diagram showing the illustrative forms of the discharge port and the inflow port (a seventh embodiment).

DETAILED DESCRIPTION OF THE INVENTION

The invention will now be described by reference to the preferred embodiments. This does not intend to limit the scope of the present invention, but to exemplify the invention.

First Embodiment

In a known servo-valve, a discharge port formed in a nozzle and an inflow port formed in a receiver both have a circular form. According to the survey of the inventors, when a form of a discharge port or an inflow port (hereinafter, also referred to as an "opening") is changed to a non-circular form, an area of overlapping between the discharge port and the inflow port abruptly increases compared to a case in which the opening is circular under a short nozzle stroke (a nozzle movement amount). As a result, since a necessary flow rate can be ensured at an early timing, a servo-valve and an actuator driven by the servo-valve are operated with high responsiveness. In the first embodiment, an illustrative servo-valve capable of realizing a high response performance using a non-circular opening will be described.

Figure 1:
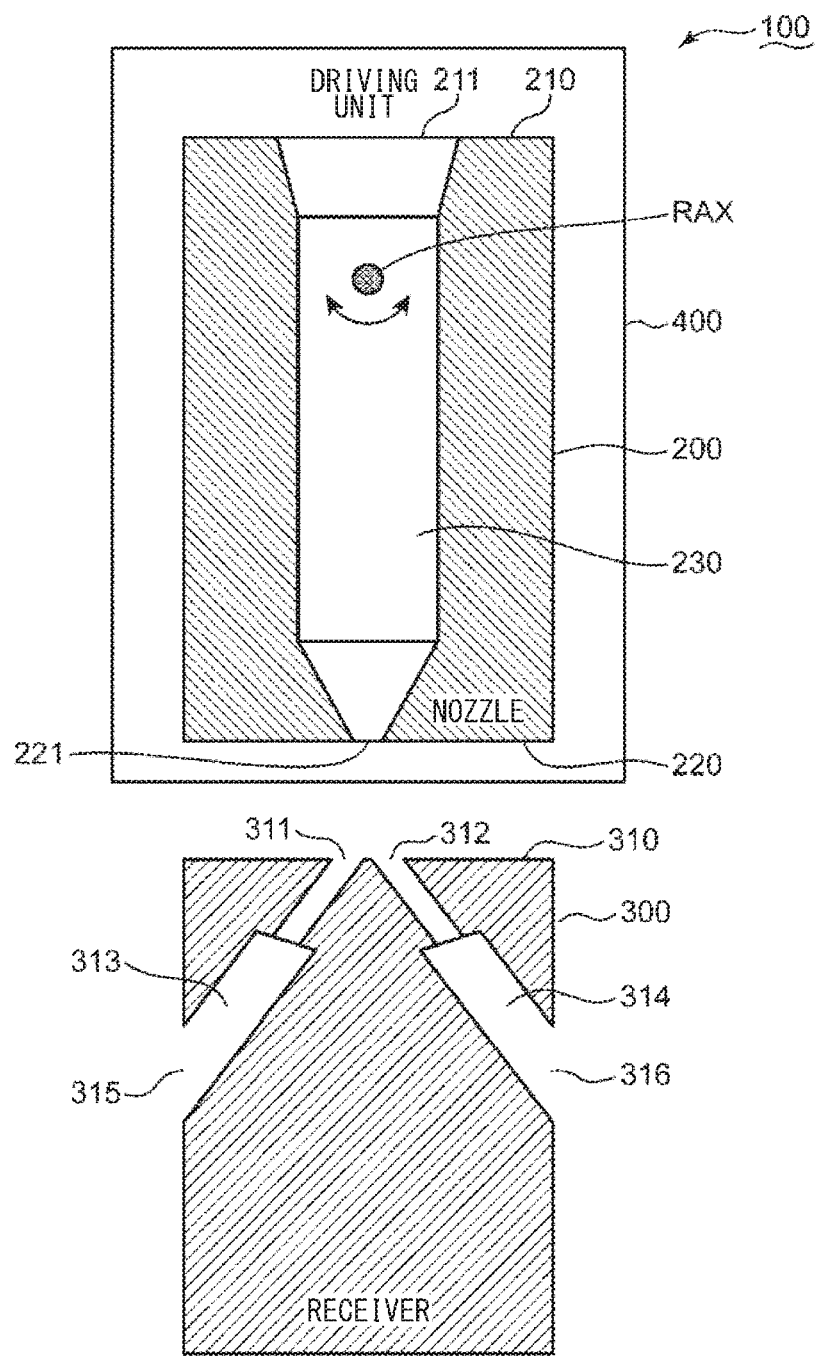
FIG. 1 is a conceptual diagram showing a servo-valve of a first embodiment.

FIG. 1 is a conceptual diagram showing a servo-valve 100 of a first embodiment. The servo-valve 100 will be described with reference to FIG. 1. Terms like "upward," "downward," "leftward," "rightward," "clockwise," "counterclockwise," "vertical," and "horizontal" indicating directions are used merely for the purpose of making the explanation unambiguous. The principle of the embodiments is not by any means limited by these terms denoting the directions.

The servo-valve 100 includes a nozzle 200, a receiver 300, and a driving unit 400. The driving unit 400 turns (swings) (hereinafter, referred to as "oscillation movement" or "oscillation") a front end of the nozzle 200 in both directions (clockwise and counterclockwise) within a predetermined angle range about a rotation axis RAX defined at an upper portion of the nozzle 200. The driving unit 400 may be a general torque motor which gives a rotational force (a turning force) to the nozzle 200 using an electromagnetic force or other driving devices. The principle of the embodiment is not limited to a specific device used as the driving unit 400.

The nozzle 200 includes an upper surface 210 and a lower surface 220. The lower surface 220 faces the receiver 300. The upper surface 210 is located above the lower surface 220. The upper surface 210 is provided with an inflow port 211. The inflow port 211 is connected to a pump or other fluid supply sources supplying a hydraulic fluid. The hydraulic fluid (which will be referred to as, for example, hydraulic oil, but may be simply referred to as a "fluid" on the condition that the invention is not limited thereto) flows into the nozzle 200 through the inflow port 211.

The lower surface 220 (the front end surface) is provided with a discharge port 221. The nozzle 200 is provided with a nozzle flow path 230 which extends downward from the inflow port 211 and is coupled to the discharge port 221. The nozzle flow path 230 becomes narrow toward the discharge port 221. The hydraulic fluid which flows from the inflow port 211 into the nozzle 200 flows downward along the nozzle flow path 230 and is discharged from the discharge port 221. Subsequently, the hydraulic fluid flows into the receiver 300.

The receiver 300 includes an upper surface (an opposite surface) 310 which faces the lower surface 220 of the nozzle 200. The upper surface 310 is provided with a left inflow port 311 and a right inflow port 312. Each of the left inflow port 311 and the right inflow port 312 is formed to be larger than the discharge port 221. The receiver 300 is provided with a left flow path 313 and a right flow path 314. The left flow path 313 extends leftward and downward from the left inflow port 311 and is terminated at the left outflow port 315. The right flow path 314 extends rightward and downward from the right inflow port 312 and is terminated at the right outflow port 316. The left outflow port 315 and the right outflow port 316 are formed in an outer surface of the receiver 300 and are coupled to a spool valve (not shown) or an actuator (not shown).

A position of the nozzle 200 when a center axis of the nozzle flow path 230 (an axis line connecting a center of the inflow port 211 and a center of the discharge port 221) matches a vertical axis will be referred to as an "initial position." When the nozzle 200 is located at the initial position, the hydraulic fluid discharged from the discharge port 221 flow in substantially in the same quantity into the left inflow port 311 and the right inflow port 312. In the embodiment, the first inflow port is exemplified by one of the left inflow port 311 and the right inflow port 312. The second inflow port is exemplified by the other of the left inflow port 311 and the right inflow port 312.

When the nozzle 200 is oscillated from the initial position by the driving unit 400, the discharge port 221 moves leftward. At this time, the area of overlapping between the discharge port 221 and the left inflow port 311 increases and the area of overlapping between the discharge port 221 and the right inflow port 312 decreases. As a result, the hydraulic fluid mainly flows into the left inflow port 311. The hydraulic fluid which flows into the left inflow port 311 flows out of the left outflow port 315 to drive the spool valve or the actuator. All this while, the spool valve or the actuator extrudes the hydraulic fluid stored therein. The hydraulic fluid which is extruded by the spool valve or the actuator flows from the right outflow port 316 into the right flow path 314. Subsequently, the hydraulic fluid which flows into the right flow path 314 flows from the right inflow port 312 to a gap between the lower surface 220 of the nozzle 200 and the upper surface 310 of the receiver 300. The hydraulic fluid which flows into the gap between the lower surface 220 of the nozzle 200 and the upper surface 310 of the receiver 300 may be returned to a predetermined storage tank.

When the nozzle 200 is oscillated counterclockwise from the initial position by the driving unit 400, the discharge port 221 moves rightward. At this time, the area of overlapping between the discharge port 221 and the right inflow port 312 increases and the area of overlapping between the discharge port 221 and the left inflow port 311 decreases. As a result, the hydraulic fluid mainly flows into the right inflow port 312. The hydraulic fluid which flows into the right inflow port 312 flows out of the right outflow port 316 to drive the spool valve or the actuator. All this while, the spool valve or the actuator extrudes the hydraulic fluid stored therein. The hydraulic fluid which is extruded by the spool valve or the actuator flows from the left outflow port 315 into the left flow path 313. Subsequently, the hydraulic fluid which flows into the left flow path 313 flows from the left inflow port 311 to a gap between the lower surface 220 of the nozzle 200 and the upper surface 310 of the receiver 300. The hydraulic fluid which flows into the gap between the lower surface 220 of the nozzle 200 and the upper surface 310 of the receiver 300 may be returned to a predetermined storage tank. In the embodiment, the first direction is exemplified by one of left and right directions.

Various techniques used in the existing servo-valve may be applied when the hydraulic fluid is supplied, circulated, and stored. The principle of the embodiment is not limited to a specific process for the hydraulic fluid.

The discharge port 221 may be a non-circular opening. In this case, the left inflow port 311 and the right inflow port 312 may be circular openings or non-circular openings. The discharge port 221 may be a circular opening. In this case, at least one of the left inflow port 311 and the right inflow port 312 is a non-circular opening.

Figure 2:
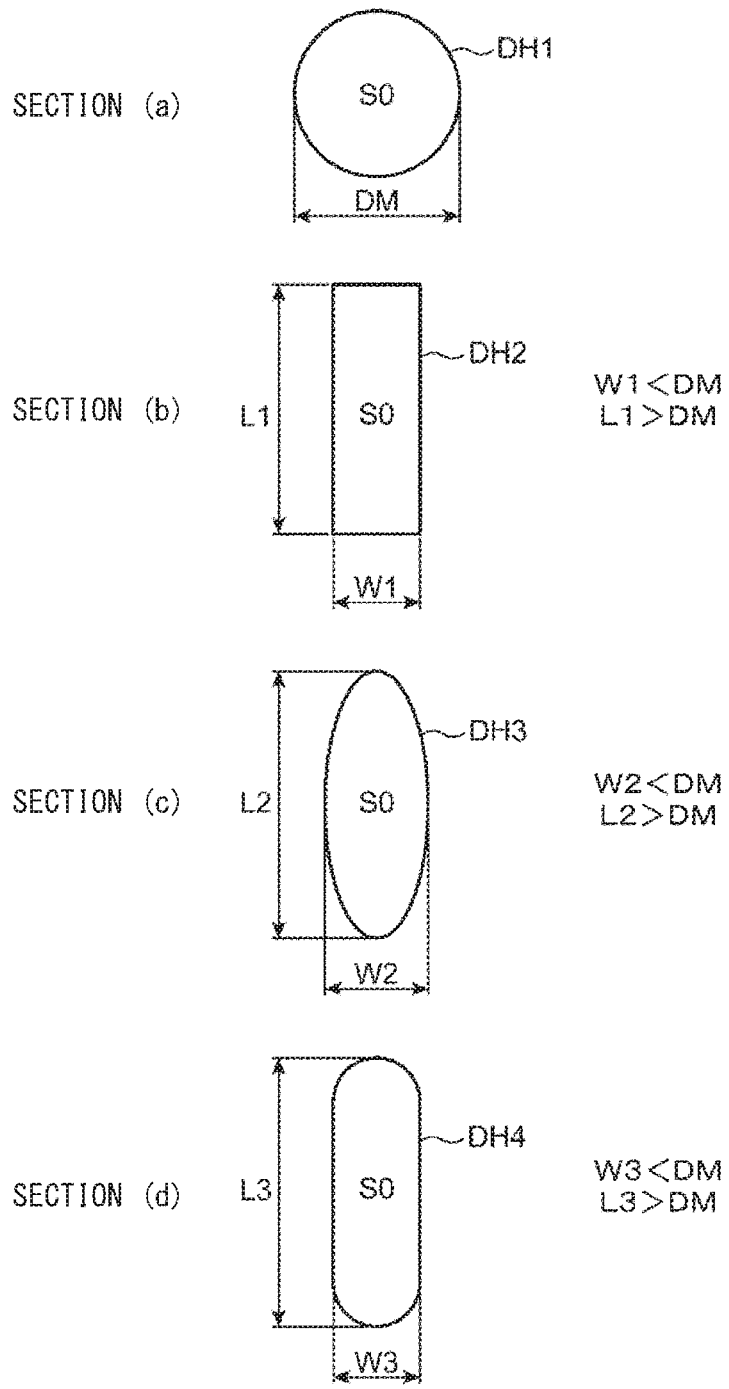
FIG. 2 shows an illustrative form of a discharge port of the servo-valve shown in FIG. 1.

FIG. 2 shows an illustrative form of the discharge port 221. Referring to FIGS. 1 and 2, a form of the discharge port 221 will be described.

The section (a) of FIG. 2 shows a discharge port DH1 of a known nozzle. The sections (b) to (d) of FIG. 2 respectively indicate discharge ports DH2, DH3, and DH4 which can be used as the discharge port 221 described with reference to FIG. 1.

The discharge port DH1 is circular. The discharge port DH1 includes an area S0. In the section (a) of FIG. 2, the diameter of the discharge port DH1 is indicated by a sign "DM." In the embodiment, the diameter of the virtual circle is exemplified by the diameter DM.

The discharge port DH2 is rectangular. Like the discharge port DH1, the discharge port DH2 includes an area S0. In the section (b) of FIG. 2, the width of the discharge port DH2 is indicated by a sign "W1." The width W1 of the discharge port DH2 may be defined as a dimension of the discharge port DH2 in the movement direction of the discharge port 221 or may be defined as a length of a short side of the discharge port DH2. As shown in the section (b) of FIG. 2, the width W1 of the discharge port DH2 is smaller than the diameter DM of the discharge port DH1.

The discharge port DH3 is elliptical. Like the discharge port DH1, the discharge port DH3 includes an area S0. In the section (c) of FIG. 2, the width of the discharge port DH3 is indicated by a sign "W2." The width W2 of the discharge port DH3 may be defined as a dimension of the discharge port DH3 in the movement direction of the discharge port 221 or may be defined as a length of a short axis of the discharge port DH3. As shown in the section (c) of FIG. 2, the width W2 of the discharge port DH3 is smaller than the diameter DM of the discharge port DH1.

The discharge port DH4 has an elliptical form including two half arcs and two lines. Each of two lines extends in a direction orthogonal to the movement direction of the discharge port 221. Two lines are arranged in series in the movement direction of the discharge port 221. Two half arcs respectively connects ends of two lines. Like the discharge port DH1, the discharge port DH4 includes an area S0. In the section (d) of FIG. 2, the width of the discharge port DH4 is indicated by a sign "W3." The width W3 of the discharge port DH4 may be defined as a dimension of the discharge port DH4 in the movement direction of the discharge port 221 or may be defined as a gap between the lines of the discharge port DH3. As shown in the section (d) of FIG. 2, the width W3 of the discharge port DH4 is smaller than the diameter DM of the discharge port DH1.

The sections (b) to (d) of FIG. 2 respectively indicate dimensions "L1," "L2," and "L3" of discharge ports DH2, DH3, and DH4 in the longitudinal direction defined as a direction orthogonal to the movement direction of the discharge port 221 and the discharge direction of the hydraulic fluid discharged from the discharge port 221 at the initial position. As described above, the areas of the discharge ports DH2, DH3, and DH4 are the same as that of the discharge port DH1 and the widths W1, W2, and W3 of the discharge ports DH2, DH3, and DH4 are respectively smaller than the diameter DM of the discharge port DH1. Thus, the length dimensions L1, L2, and L3 of the discharge ports DH2, DH3, and DH4 are respectively larger than the diameter DM of the discharge port DH1. In the embodiment, the second direction is exemplified by the longitudinal direction.

Each of the discharge ports DH2, DH3, and DH4 has a symmetrical form with respect to an axis extended in the longitudinal direction. When the symmetrical form with respect to the axis extended in the longitudinal direction is selected as the form of the discharge port 221, the hydraulic fluid flows in substantially in the same quantity into the left inflow port 311 and the right inflow port 312 when the nozzle 200 is located at the initial position.

Figure 3:
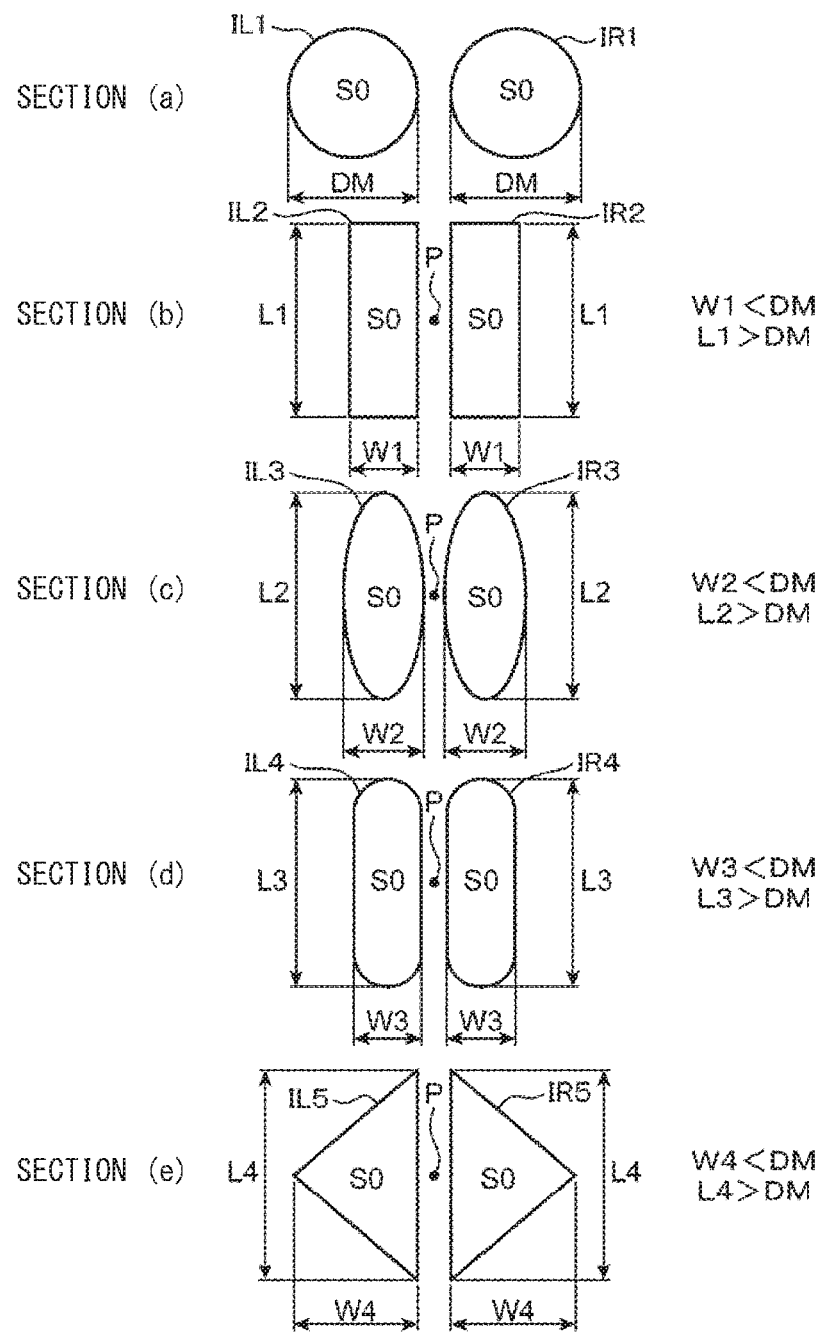
FIG. 3 shows illustrative forms of a left inflow port and a right inflow port of the servo-valve shown in FIG. 1.

FIG. 3 shows illustrative forms of the left inflow port 311 and the right inflow port 312. Referring to FIGS. 1 and 3, the forms of the left inflow port 311 and the right inflow port 312 will be described.

The section (a) of FIG. 3 indicates a left inflow port IL1 and a right inflow port IR1 of a known receiver. The sections (b) to (e) of FIG. 3 respectively indicate left inflow ports IL2, IL3, IL4, and IL5 used as the left inflow port 311 and right inflow ports IR2, IR3, IR4, and IR5 used as the right inflow port 312 described with reference to FIG. 1.

Each of the left inflow port IL1 and the right inflow port IR1 is circular. Each of the left inflow port IL1 and the right inflow port IR1 includes an area S0. In the section (a) of FIG. 3, the diameter of each of the left inflow port IL1 and the right inflow port IR1 is indicated by a sign "DM." In the embodiment, the diameter of the virtual circle is exemplified by the diameter DM.

Each of the left inflow port IL2 and the right inflow port IR2 is rectangular. Like the left inflow port IL1, the left inflow port IL2 includes an area S0. Like the right inflow port IR1, the right inflow port IR2 includes an area S0. In the section (b) of FIG. 3, the width of each of the left inflow port IL2 and the right inflow port IR2 is indicated by a sign "W1." The widths W1 of the left inflow port IL2 and the right inflow port IR2 may be respectively defined as dimensions of the left inflow port IL2 and the right inflow port IR2 in the movement direction of the discharge port 221 and may be defined as lengths of short sides of the left inflow port IL2 and the right inflow port IR2. As shown in the section (b) of FIG. 3, the widths W1 of the left inflow port IL2 and the right inflow port IR2 are respectively smaller than the diameters DM of the left inflow port IL1 and the right inflow port IR1.

Each of the left inflow port IL3 and the right inflow port IR3 is elliptical. Like the left inflow port IL1, the left inflow port IL3 includes an area S0. Like the left inflow port IL1, the right inflow port IR3 includes an area S0. In the section (c) of FIG. 3, the widths of the left inflow port IL3 and the right inflow port IR3 are respectively indicated by a sign "W2." The widths W2 of the left inflow port IL3 and the right inflow port IR3 may be defined as the dimensions of the left inflow port IL3 and the right inflow port IR3 in the movement direction of the discharge port 221 and may be defined as lengths of short axes of the left inflow port IL3 and the right inflow port IR3. As shown in the section (c) of FIG. 3, the widths W2 of the left inflow port IL3 and the right inflow port IR3 are respectively smaller than the diameters DM of the left inflow port IL1 and the right inflow port IR1.

Each of the left inflow port IL4 and the right inflow port IR4 has an elliptical form including two half arcs and two lines. Each of two lines extends in a direction orthogonal to the movement direction of the discharge port 221. Two lines are arranged in series in the movement direction of the discharge port 221. Two half arcs respectively connect ends of two lines. Like the left inflow port IL1, the left inflow port IL4 includes an area S0. Like the right inflow port IR1, the right inflow port IR4 includes an area S0. In the section (d) of FIG. 3, the widths of the left inflow port IL4 and the right inflow port IR4 are respectively indicated by a sign "W3." The widths W3 of the left inflow port IL4 and the right inflow port IR4 may be respectively defined as the dimensions of the left inflow port IL4 and the right inflow port IR4 in the movement direction of the discharge port 221 and may be defined as gaps between the lines of the left inflow port IL4 and the right inflow port IR4. As shown in the section (d) of FIG. 3, the widths W3 of the left inflow port IL4 and the right inflow port IR4 are smaller than the diameter DM of the discharge port DH1.

Each of the left inflow port IL5 and the right inflow port IR5 is triangular. Like the left inflow port IL1, the left inflow port IL5 includes an area S0. Like the right inflow port IR1, the right inflow port IR5 includes an area S0. In the section (e) of FIG. 3, the widths of the left inflow port IL5 and the right inflow port IR5 are indicated by a sign "W4." The widths W4 of the left inflow port IL5 and the right inflow port IR5 are respectively defined as the dimensions of the left inflow port IL5 and the right inflow port IR5 in the movement direction of the discharge port 221. As shown the section (d) of FIG. 3, the widths W4 of the left inflow port IL5 and the right inflow port IR5 are smaller than the diameters DM of the left inflow port IL1 and the right inflow port IR1.

In the section (b) of FIG. 3, the dimension of each of the left inflow port IL2 and the right inflow port IR2 in the longitudinal direction is indicated by "L1." In the section (c) of FIG. 3, the dimension of each of the left inflow port IL3 and the right inflow port IR3 in the longitudinal direction is indicated by "L2." In the section (d) of FIG. 3, the dimension of each of the left inflow port IL4 and the right inflow port IR4 in the longitudinal direction is indicated by "L3." In the section (e) of FIG. 3, the dimension of each of the left inflow port IL5 and the right inflow port IR5 in the longitudinal direction is indicated by "L4." As described above, the areas of the left inflow ports IL2, IL3, IL4, and IL5 and the right inflow ports IR2, IR3, IR4, and IR5 are respectively the same as those of the left inflow port IL1 and the right inflow port IR1 and the widths W1, W2, W3, and W4 of the left inflow ports IL2, IL3, IL4, and IL5 and the right inflow ports IR2, IR3, IR4, and IR5 are smaller than the diameters DM of the left inflow port IL1 and the right inflow port IR1. Thus, the length dimensions L1, L2, L3, and L4 of the left inflow ports IL2, IL3, IL4, and IL5 and the right inflow ports IR2, IR3, IR4, and IR5 are larger than the diameters DM of the left inflow port IL1 and the right inflow port IR1.

The sections (b) to (e) of FIG. 3 show a point P. The point P is located on an extended line which passes through the center of the discharge port 221 of the nozzle 200 at the initial position and extends in the discharge direction of the hydraulic fluid discharged from the discharge port 221 of the nozzle 200 at the initial position. The point P shown in the section (b) of FIG. 3 is located at the midpoint of the line connecting the center of the left inflow port IL2 and the center of the right inflow port IR2. The left inflow port IL2 has a mirror image relation with respect to the right inflow port IR2 in a virtual plane (not shown) enclosing the line passing through the point P and extended in the longitudinal direction and the extended line extended in the discharge direction of the hydraulic fluid discharged from the discharge port 221 of the nozzle 200 located at the initial position. The point P shown in the section (c) of FIG. 3 is located at the midpoint of the line connecting the center of the left inflow port IL3 and the center of the right inflow port IR3. The left inflow port IL3 has a mirror image relation with respect to the right inflow port IR3 in the virtual plane (not shown) enclosing the line passing through the point P and extended in the longitudinal direction and the extended line extended in the discharge direction of the hydraulic fluid discharged from the discharge port 221 of the nozzle 200 located at the initial position. The point P shown in the section (d) of FIG. 3 is located at the midpoint of the line connecting the center of the left inflow port IL4 and the center of the right inflow port IR4. The left inflow port IL4 has a mirror image relation with respect to the right inflow port IR4 in the virtual plane (not shown) enclosing the line passing through the point P and extended in the longitudinal direction and the extended line extended in the discharge direction of the hydraulic fluid discharged from the discharge port 221 of the nozzle 200 located at the initial position. The point P shown in the section (e) of FIG. 3 is located at the midpoint of the line connecting the center of the left inflow port IL5 and the center of the right inflow port IR5. The left inflow port IL5 has a mirror image relation with respect to the right inflow port IR5 in the virtual plane (not shown) enclosing the line passing through the point P and extended in the longitudinal direction and the extended line extended in the discharge direction of the hydraulic fluid discharged from the discharge port 221 of the nozzle 200 located at the initial position.

Second Embodiment

A servo-valve can have a high response performance when an area of overlapping between a discharge port and an inflow port changes greatly in response to the movement of a nozzle. In a second embodiment, an illustrative relation between the discharge port and the inflow port will be described.

Figure 4:
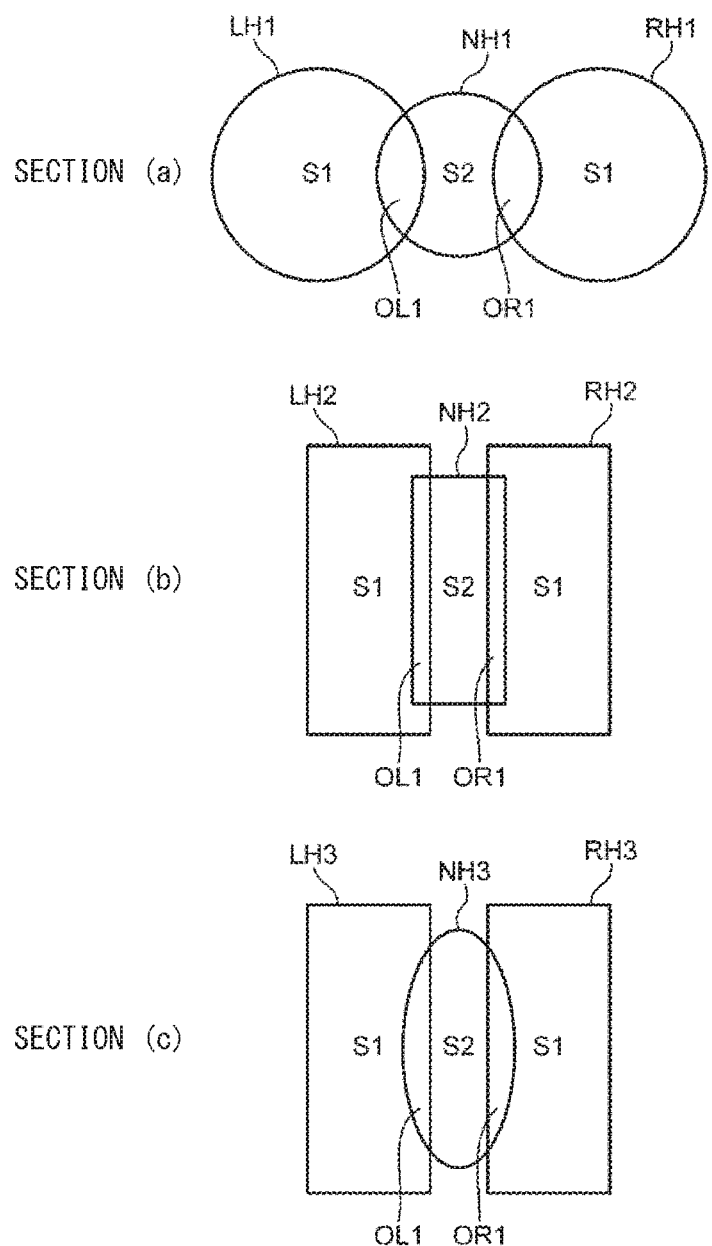
FIG. 4 is a conceptual diagram showing an illustrative relation of the discharge port, the left inflow port, and the right inflow port of the servo-valve shown in FIG. 1 (a second embodiment).

FIG. 4 is a conceptual diagram showing an illustrative relation of the discharge port 221, the left inflow port 311, and the right inflow port 312. Referring to FIGS. 1 to 4, the form of the discharge port 221 will be described.

The section (a) of FIG. 4 shows a discharge port NH1, a left inflow port LH1, and a right inflow port RH1 of a known nozzle. The section (b) of FIG. 4 shows a discharge port NH2 which can be used as the discharge port 221 described with reference to FIG. 1, a left inflow port LH2 which can be used as the left inflow port 311 described with reference to FIG. 1, and a right inflow port RH2 which can be used as the right inflow port 312 described with reference to FIG. 1. The section (c) of FIG. 4 shows a discharge port NH3 which can be used as the discharge port 221 described with reference to FIG. 1, a left inflow port LH3 which can be used as the left inflow port 311 described with reference to FIG. 1, and a right inflow port RH3 which can be used as the right inflow port 312 described with reference to FIG. 1.

In the section (a) of FIG. 4, the areas of the left inflow port LH1 and the right inflow port RH1 are indicated by a sign "S1." In the section (a) of FIG. 4, the area of the discharge port NH1 is indicated by a sign "S2." The area S1 is larger than the area S2. One of the area S1 and the area S2 corresponds to the area S0 described with reference to FIGS. 2 and 3.

Like the left inflow port LH1, the left inflow port LH2 shown in the section (b) of FIG. 4 includes an area S1. Like the right inflow port RH1, the right inflow port RH2 shown in the section (b) of FIG. 4 includes an area S1. Like the discharge port NH1, the discharge port NH2 shown in the section (b) of FIG. 4 includes an area S2.

Like the left inflow port LH1, the left inflow port LH3 shown in the section (c) of FIG. 4 includes an area S1. Like the right inflow port RH1, the right inflow port RH3 shown in the section (c) of FIG. 4 includes an area S1. Like the discharge port NH1, the discharge port NH3 shown in the section (c) of FIG. 4 includes an area S2.

The discharge port NH1 shown in the section (a) of FIG. 4 partially overlaps each of the left inflow port LH1 and the right inflow port RH1. In the section (a) of FIG. 4, the area of overlapping between the discharge port NH1 and the left inflow port LH1 is indicated by a sign "OL1." In the section (a) of FIG. 4, the area of overlapping between the discharge port NH1 and the right inflow port RH1 is indicated by a sign "OR1." When the discharge port NH1 moves leftward, the area of overlapping OL1 increases and the area of overlapping OR1 decreases. When the discharge port NH1 moves rightward, the area of overlapping OR1 increases and the area of overlapping OL1 decreases. When the area of overlapping OL1 is the same as the area of overlapping OR1, the nozzle 200 is located at the initial position.

The discharge port NH2 shown in the section (b) of FIG. 4 partially overlaps each of the left inflow port LH2 and the right inflow port RH2. The relative positional relation between the left inflow port LH2 and the discharge port NH2 is set so that the area of overlapping between the discharge port NH2 and the left inflow port LH2 matches the area of overlapping OL1. The relative positional relation between the right inflow port RH2 and the discharge port NH2 is set so that the area of overlapping between the discharge port NH2 and the right inflow port RH2 matches the area of overlapping OR1. When the discharge port NH2 moves leftward, the area of overlapping OL1 increases and the area of overlapping OR1 decreases. When the discharge port NH2 moves rightward, the area of overlapping OR1 increases and the area of overlapping OL1 decreases. In the embodiment, the initial position may be exemplified by the position of the nozzle 200 which holds the positional relation shown in the section (b) of FIG. 4.

The discharge port NH3 shown in the section (c) of FIG. 4 partially overlaps the left inflow port LH3 and the right inflow port RH3. The relative positional relation between the left inflow port LH3 and the discharge port NH3 is set so that the area of overlapping between the discharge port NH3 and the left inflow port LH3 matches the area of overlapping OL1. The relative positional relation between the right inflow port RH3 and the discharge port NH3 is set so that the area of overlapping between the discharge port NH3 and the right inflow port RH3 matches the area of overlapping OR1. When the discharge port NH3 moves leftward, the area of overlapping OL1 increases and the area of overlapping OR1 decreases. When the discharge port NH3 moves rightward, the area of overlapping OR1 increases and the area of overlapping OL1 decreases. In the embodiment, the initial position may be exemplified as the position of the nozzle 200 which holds the positional relation shown in the section (c) of FIG. 4.

Each of the left inflow port LH1 and the right inflow port RH1 shown in the section (a) of FIG. 4 has a circular form including a radius R1. The discharge port NH1 shown in the section (a) of FIG. 4 has a circular form including a radius R2 smaller than the radius R1. Thus, the curvature of each outline of the left inflow port LH1 and the right inflow port RH1 inside the discharge port NH1 is "1/R1." The curvature of the outline of the discharge port NH1 inside the left inflow port LH1 or the right inflow port RH1 is "1/R2." In the embodiment, the virtual circle is exemplified by the circular form of each of the discharge port NH1, the left inflow port LH1, and the right inflow port RH1.

Each of the discharge port NH2, the left inflow port LH2, and the right inflow port RH2 shown in the section (b) of FIG. 4 has a rectangular form in the longitudinal direction. The centers of the discharge port NH2, the left inflow port LH2, and the right inflow port RH2 are aligned in the movement direction of the discharge port NH2. A gap of a pair of short sides of each of the left inflow port LH2 and the right inflow port RH2 (a side extended in the movement direction of the discharge port NH2) is wider than a gap of a pair of short sides of the discharge port NH2 (a side extended in the movement direction of the discharge port NH2). Thus, a part of each of long sides of the left inflow port LH2 and the right inflow port RH2 is enclosed in the discharge port NH2. A pair of long sides of the discharge port NH2 (a side extended in a direction orthogonal to the movement direction of the discharge port NH2) is enclosed in the left inflow port LH2 and the right inflow port RH2 on the whole. Since the curvature of the long side is zero, the curvature is smaller than the curvatures "1/R1" and "1/R2" described in the section (a) of FIG. 4.

The discharge port NH3 shown in the section (c) of FIG. 4 is shaped in an ellipse elongated in the longitudinal direction and each of the left inflow port LH3 and the right inflow port RH3 has a rectangular form elongated in the longitudinal direction. The centers of the discharge port NH3, the left inflow port LH3, and the right inflow port RH3 are aligned in the movement direction of the discharge port NH3. As shown in the section (c) of FIG. 4, a gap of a pair of short sides of each of the left inflow port LH3 and the right inflow port RH3 (a side extended in the movement direction of the discharge port NH3) is wider than the long axis dimension of the discharge port NH3. Thus, a part of long sides of the left inflow port LH3 and the right inflow port RH3 are enclosed in the discharge port NH3. Since the curvatures of the long sides are zero, the curvatures are smaller than the curvatures "1/R1" and "1/R2" described with reference to the section (a) of FIG. 4. The outline having a small curvature (<1/R2) of the discharge port NH3 is located inside each of the left inflow port LH3 and the right inflow port RH3 and the outline having a large curvature (>1/R2) of the discharge port NH3 is located between the left inflow port LH3 and the right inflow port RH3.

Figure 5:
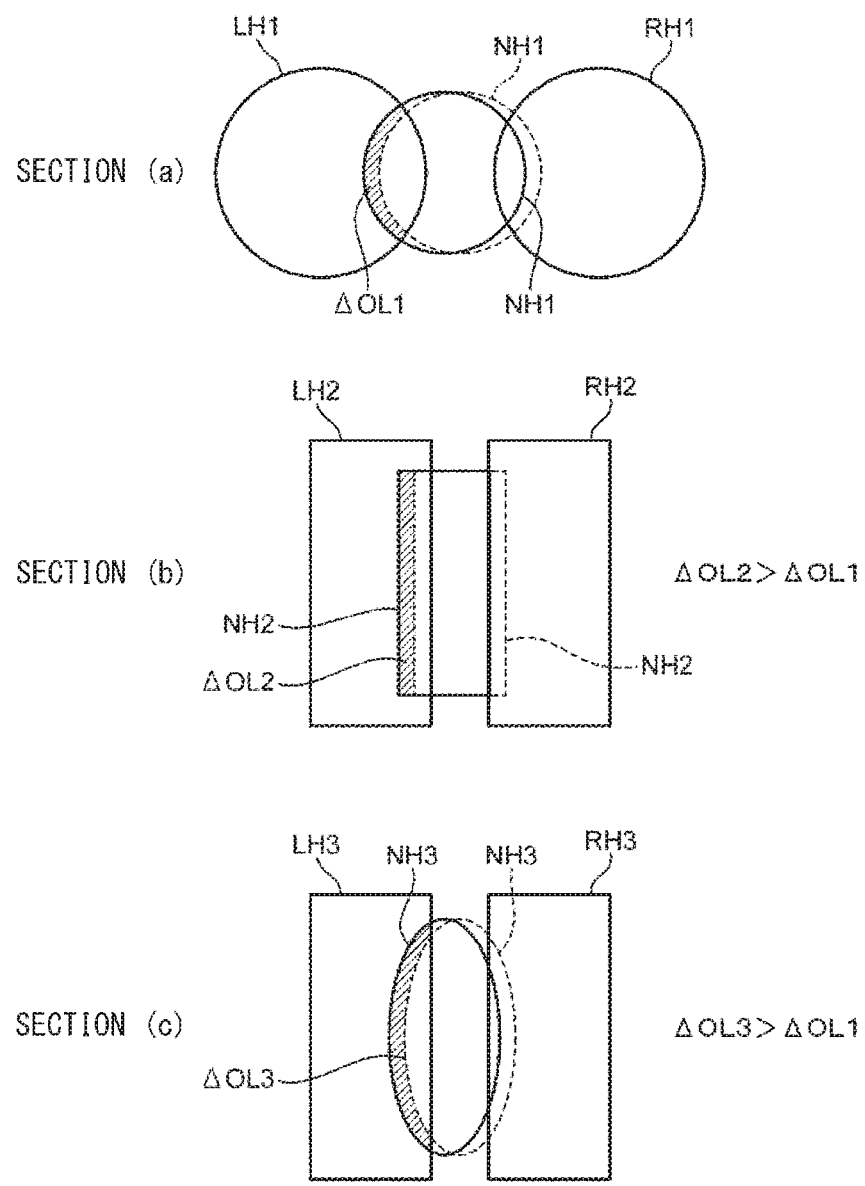
FIG. 5 is a conceptual diagram showing a change in area of overlapping of the discharge port, the left inflow port, and the right inflow port of the servo-valve shown in FIG. 1.

FIG. 5 is a conceptual diagram showing a change in area of overlapping. Referring to FIGS. 1, 4, and 5, a change in area of overlapping will be described.

The section (a) of FIG. 5 shows a change in area of overlapping between the discharge port NH1 and the left inflow port LH1 when the discharge port NH1 is displaced leftward. The discharge port NH1 indicated by a dotted line in the section (a) of FIG. 5 corresponds to the position of the discharge port NH1 described in the section (a) of FIG. 4. The hatching area shown in the section (a) of FIG. 5 indicates an increment of the area of overlapping between the discharge port NH1 and the left inflow port LH1. An increment of the area of overlapping when the discharge port NH1 is displaced leftward is indicated by a sign "ΔOL1."

The section (b) of FIG. 5 shows a change in area of overlapping between the discharge port NH2 and the left inflow port LH2 when the discharge port NH2 is displaced leftward. The discharge port NH2 indicated by a dotted line in the section (b) of FIG. 5 corresponds to the position of the discharge port NH2 described with respect to the section (b) of FIG. 4. The leftward movement amount of the discharge port NH2 is the same as the leftward movement amount of the discharge port NH1. The hatching area shown in the section (b) of FIG. 5 indicates an increment of the area of overlapping between the discharge port NH2 and the left inflow port LH2. An increment of the area of overlapping when the discharge port NH2 is displaced leftward is indicated by a sign "ΔOL2." The increment ΔOL2 of the area of overlapping shown in the section (b) of FIG. 5 is larger than the increment ΔOL1 of the area of overlapping shown in the section (a) of FIG. 5. This means that the inflow amount to the left inflow port 311 and the right inflow port 312 greatly changes under a short stroke of the nozzle 200 when the form relation shown in the section (b) of FIG. 5 is used. That is, the servo-valve 100 can have a high response performance.

The section (c) of FIG. 5 shows a change in area of overlapping between the discharge port NH3 and the left inflow port LH3 when the discharge port NH3 is displaced leftward. The discharge port NH3 indicated by a dotted line in the section (c) of FIG. 5 corresponds to the position of the discharge port NH3 described in the section (c) of FIG. 4. The leftward movement amount of the discharge port NH3 is the same as the leftward movement amount of the discharge port NH1. The hatching area shown in the section (c)

of FIG. 5 indicates an increment of the area of overlapping between the discharge port NH3 and the left inflow port LH3. An increment of the area of overlapping when the discharge port NH3 is displaced leftward is indicated by a sign "ΔOL3." The increment ΔOL3 of the area of overlapping shown in the section (c) of FIG. 5 is larger than the increment ΔOL1 of the area of overlapping shown in the section (a) of FIG. 5. This means that the inflow amount to the left inflow port 311 and the right inflow port 312 greatly changes under a short stroke of the nozzle 200 when the shale relation shown in the section (c) of FIG. 5 is used. That is, the servo-valve 100 can have a high response performance.

Third Embodiment

When the inflow port is sufficiently larger than the discharge port, the hydraulic fluid discharged from the discharge port can efficiently flow into the inflow port. In a third embodiment, an illustrative method for setting size of the inflow port will be described.

Figure 6:
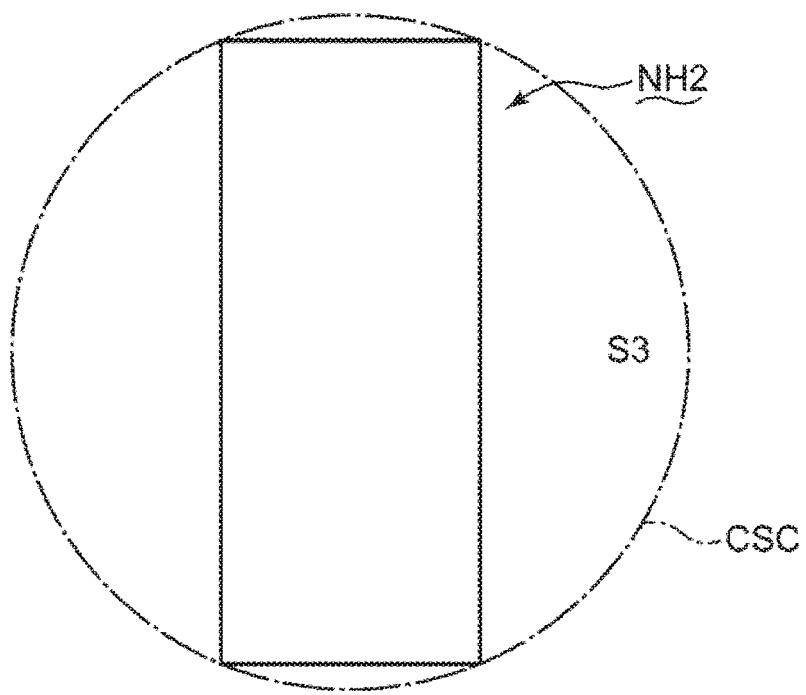
FIG. 6 shows a rectangular discharge port drawn inside a circumscribed circle (a third embodiment and a fourth embodiment).

FIG. 6 shows the rectangular discharge port NH2 drawn inside the circumscribed circle CSC. Referring to FIGS. 1, 4, and 6, an illustrative size setting method for the left inflow port LH2 and the right inflow port RH2 will be described.

In FIG. 6, an area of the circumscribed circle CSC is indicated by a sign "S3." The area S1 of each of the left inflow port LH2 and the right inflow port RH2 may be set to be larger than the area S3 of the circumscribed circle CSC. In this case, a designer can set the form and the size of the left inflow port LH2 so that the left inflow port LH2 surrounds the entire area of overlapping between the left inflow port LH2 and the discharge port NH2 when the discharge port NH2 moves to the leftmost side. Similarly, the design can set the form and the size of the right inflow port RH2 so that the right inflow port RH2 surrounds the entire area of overlapping between the right inflow port RH2 and the discharge port NH2 when the discharge port NH2 moves to the rightmost side.

If the left inflow port LH2 surrounds the entire area of overlapping between the left inflow port LH2 and the discharge port NH2 when the discharge port NH2 moves to the leftmost side, the hydraulic fluid discharged from the discharge port NH2 (that is, the discharge port 221 of FIG. 1) can flow into the left inflow port without being obstructed by the upper surface 310 (see FIG. 1) of the receiver 300 (see FIG. 1). Thus, the hydraulic fluid is efficiently supplied to the receiver 300.

If the right inflow port RH2 surrounds the entire area of overlapping between the right inflow port RH2 and the discharge port NH2 when the discharge port NH2 moves to the rightmost side, the hydraulic fluid discharged from the discharge port NH2 (that is, the discharge port 221 of FIG. 1) can flow into the right inflow port 312 (see FIG. 1) without being obstructed by the upper surface 310 (see FIG. 1) of the receiver 300 (see FIG. 1). Thus, the hydraulic fluid is efficiently supplied to the receiver 300.

Fourth Embodiment

As described in the first embodiment, the receiver is provided with two inflow ports. While the hydraulic fluid flows into one of two inflow ports, the hydraulic fluid is discharged from the other of two inflow ports. When the inflow port is excessively large, a discharge load of the hydraulic fluid from the other of two inflow ports is remarkably reduced. As a result, the actuator may not receive a sufficient pressure. In a fourth embodiment, other setting techniques for the size of the inflow port will be described.

Differently from the third embodiment, the areas S1 (see FIG. 4) of the left inflow port LH2 (see FIG. 4) and the right inflow port RH2 (see FIG. 4) may be set to be smaller than the area S3 (see FIG. 6) of the circumscribed circle CSC (see FIG. 6). In this case, the areas S1, S2, and S3 hold a relation shown in the following inequality.

$$S3>S1>S2 \qquad \text{Expression 1}$$

A designer can set the forms of the left inflow port LH2 and the right inflow port RH2 without largely increasing the sizes of the left inflow port LH2 and the right inflow port RH2 if the sizes and the forms of the left inflow port LH2 and the right inflow port RH2 are set under the relation represented by the above inequality. In this case, an actuator (not shown) can receive a sufficiently high pressure.

Fifth Embodiment

As described in the embodiment, the non-circular forms of the discharge port and the inflow port can be determined in consideration of various conditions including the area of overlapping between the discharge port and the inflow port, the easiness of the flow of the hydraulic fluid into the inflow port, and the pressure given to the actuator. In addition, a design who designs the servo-valve may determine the non-circular forms of, the discharge port and the inflow port in consideration of the pressure distribution of the hydraulic fluid discharged from the discharge port. The pressure distribution of the hydraulic fluid discharged from the discharge port approximates a Gaussian distribution having a peak at the center of the discharge port. When the peak of the pressure distribution overlaps the inflow port immediately after the nozzle starts to move, the servo-valve can achieve a high responsiveness. In a fifth embodiment, a non-circular form determining method considering the pressure distribution of the hydraulic fluid discharged from the discharge port will be described.

Figure 7:
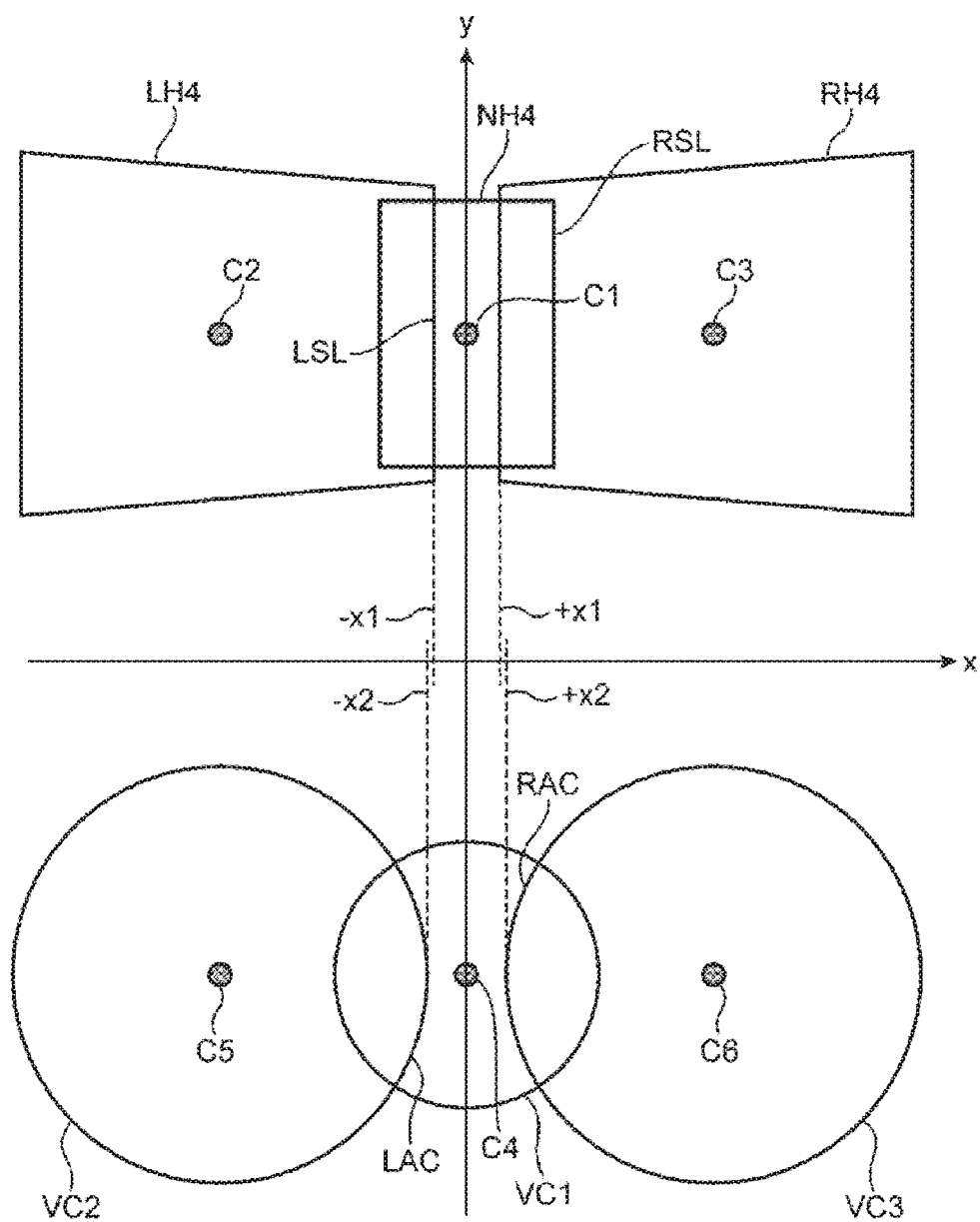
FIG. 7 is a coordinate plane in which shapes of the outline of a discharge port and an inflow port are drawn (a fifth embodiment).

FIG. 7 shows a coordinate plane in which shapes of the outline of the discharge port and the inflow port are drawn. Referring to FIGS. 1 and 7, a non-circular form determining method considering the pressure distribution of the hydraulic fluid discharged from the discharge port will be described.

FIG. 7 shows a rectangular discharge port NH4, a trapezoidal left inflow port LH4, and a trapezoidal right inflow port RH4. The form of the discharge port NH4 can be applied to the discharge port 221 described with reference to FIG. 1. The form of the left inflow port LH4 can be applied to the left inflow port 311 described with reference to FIG. 1. The form of the right inflow port RH4 can be applied to the right inflow port 312 described with reference to FIG. 1.

The position of the discharge port NH4 shown in FIG. 7 corresponds to the nozzle 200 (see FIG. 1) at the initial position. The discharge port NH4 is drawn on the y axis. A center C1 of the discharge port NH4 is located on the y axis. The peak of the pressure distribution of the hydraulic fluid discharged from the discharge port NH4 is located at the center C1.

The left inflow port LH4 is drawn at a second image limit of the coordinate shown in FIG. 7. The right inflow port RH4 is drawn at a first image limit of the coordinate shown in FIG. 7. The left inflow port LH4 is line-symmetrical to the right inflow port RH4 with respect to the y axis. That is, the form and the size of the left inflow port LH4 match those of the right inflow port RH4. The left inflow port LH4 includes a center C2. The right inflow port RH4 includes a center C3. The centers C1, C2, and C3 are aligned on a straight line parallel to the x axis. The extension direction of the x axis matches the movement direction of the nozzle 200. The discharge port NH4 partially overlaps the left inflow port LH4 and the right inflow port RH4. Each area of the left inflow port LH4 and the right inflow port RH4 is larger than the area of the discharge port NH4. In the embodiment, the first inflow port is exemplified by one of the left inflow port LH4 and the right inflow port RH4. The second inflow port is exemplified by the other of the left inflow port LH4 and the right inflow port RH4.

FIG. 7 shows a virtual circle VC1 and a center C4 of the virtual circle VC1. The virtual circle VC1 is drawn on the y axis. The center C4 is located on the y axis. The area of the virtual circle VC1 is the same as the area of the discharge port NH4. In the embodiment, the small virtual circle is exemplified by the virtual circle VC1.

FIG. 7 shows a virtual circle VC2 and a center C5 of the virtual circle VC2. The virtual circle VC2 is drawn at a third image limit. The x coordinate value of the center C5 of the virtual circle VC2 matches that of the center C2 of the left inflow port LH4. The area of the virtual circle VC2 is the same as the area of the left inflow port LH4.

FIG. 7 shows a virtual circle VC3 and a center C6 of the virtual circle VC3. The virtual circle VC3 is drawn at a fourth image limit. The x coordinate value of the center C6 of the virtual circle VC3 matches that of the center C3 of the right inflow port RH4. The area of the virtual circle VC3 is the same as the area of the right inflow port RH4. The virtual circle VC3 is line-symmetrical to the virtual circle VC2 with respect to the y axis. The centers C4, C5, and C6 are aligned on a straight line parallel to the x axis. In the embodiment, the large virtual circle is exemplified by one of the virtual circles VC2 and VC3.

The outline of the left inflow port LH4 includes a straight line LSL which partially overlaps the discharge port NH4. The line LSL is parallel to the y axis. In FIG. 7, the x coordinate value of the line LSL is indicated by a sign "−x1." The coordinate value "−x1" indicates a distance between the outline of the left inflow port 311 and the extended line extended from the center of the discharge port 221 of the nozzle 200 at the initial position in the hydraulic fluid discharge direction.

The outline of the right inflow port RH4 includes a straight line RSL which partially overlaps the discharge port NH4. The line RSL is parallel to the y axis. In FIG. 7, the x coordinate value of the line RSL is indicated by a sign "+x1." The coordinate value "+x1" indicates a distance between the outline of the right inflow port 312 and the extended line extended from the center of the discharge port 221 of the nozzle 200 at the initial position in the hydraulic fluid discharge direction.

The virtual circle VC2 includes an arc LAC which overlaps the virtual circle VC1. In FIG. 7, the x coordinate value of the line which is tangential to the arc LAC and is parallel to the y axis is indicated by a sign "−x2." The coordinate value "−x2" indicates a distance between the outline of the circular left inflow port and the extended line passing through the center of the known circular discharge port.

The virtual circle VC3 includes an arc RAC which overlaps the virtual circle VC1. In FIG. 7, the x coordinate value of the line which is tangential to the arc RAC and is parallel to the y axis is indicated by a sign "+x2." The coordinate value "+x2" indicates a distance between the outline of the circular right inflow port and the extended line passing through the center of the known circular discharge port.

In order to hold a relation expressed by the following inequality, the designer may determine the forms of the discharge port NH4, the left inflow port LH4, and the right inflow port RH4.

$$x1 < x2 \qquad \text{Expression 2}$$

When the relation expressed by the above inequality is held, the peak portion of the pressure distribution of the hydraulic fluid overlaps the left inflow port LH4 as soon as the discharge port NH4 moves leftward. As a result, a large amount of the hydraulic fluid can flow into the left inflow port LH4.

When the relation expressed by the above inequality is held, the peak portion of the pressure distribution of the hydraulic fluid overlaps the right inflow port RH4 as soon as the discharge port NH4 moves rightward. As a result, a large amount of the hydraulic fluid can flow into the right inflow port RH4.

Meanwhile, the known technique (the circular discharge port and the circular inflow port) requires a large stroke for the peak portion of the pressure distribution of the hydraulic fluid discharged from the discharge port to overlap the left or right inflow port (x2>x1). Thus, the servo-valve 100 can exhibit a high response performance when the non-circular discharge port NH4 and/or the non-circular inflow port (the left inflow port LH4 and the right inflow port RH4) designed to hold the above-described expression is applied to the nozzle 200 and/or the receiver 300 described with reference to FIG. 1.

Sixth Embodiment

The servo-valve according to the above-described embodiment can be assembled to various fluidic devices driven by the hydraulic fluid. In a sixth embodiment, an illustrative fluidic device will be described.

Figure 8:
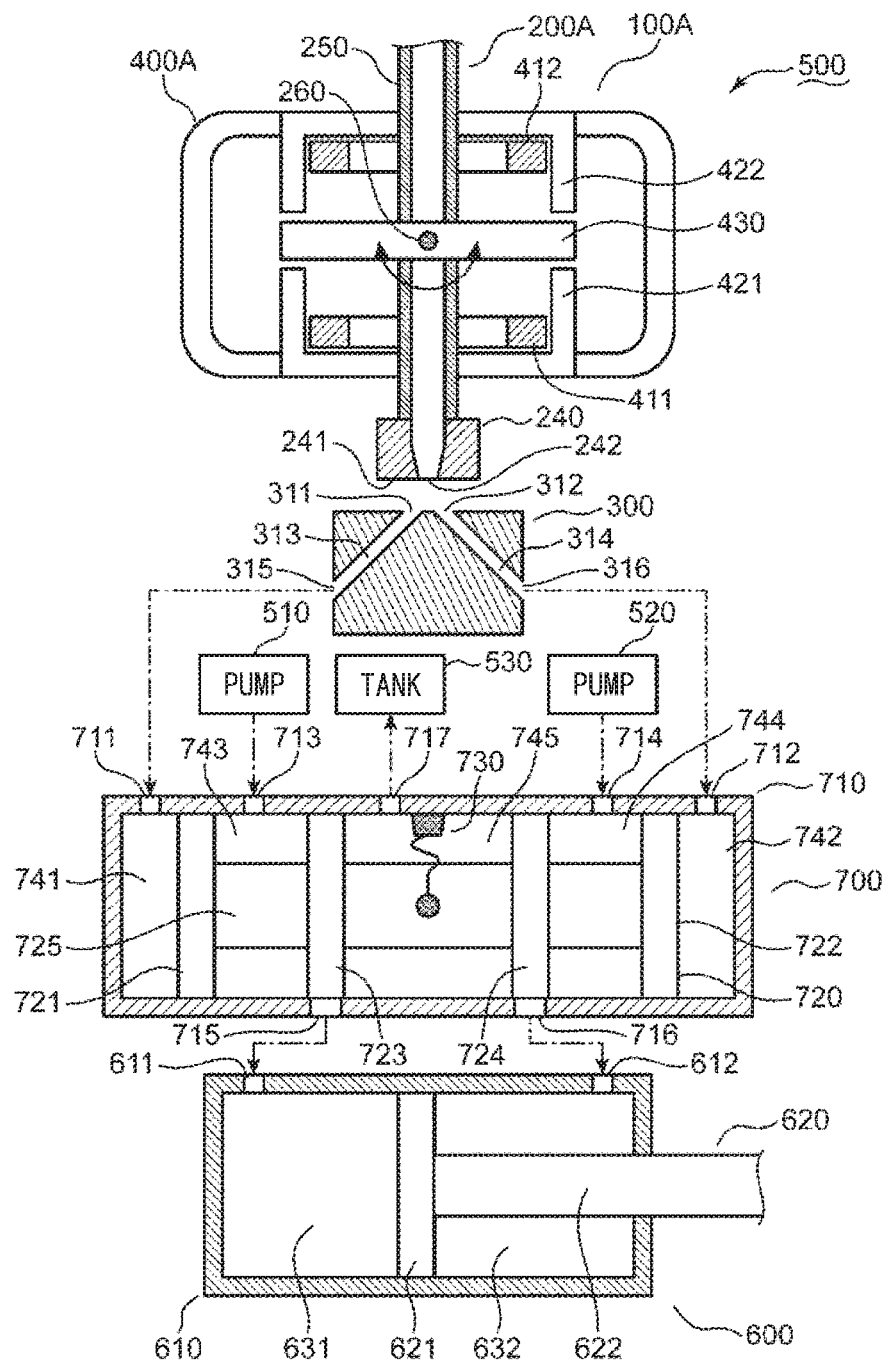
FIG. 8 is a schematic diagram showing a fluidic device of a sixth embodiment.

FIG. 8 is a schematic diagram showing a fluidic device 500 of the sixth embodiment. Referring to FIGS. 1 and 8, the fluidic device 500 will be described. The explanation of the first embodiment is incorporated in the description of the elements indicated by the same reference numerals as in the first embodiment.

The fluidic device 500 includes a servo-valve 100A, an actuator 600, two pumps 510 and 520, and a tank 530. Like the first embodiment, the servo-valve 100A includes a receiver 300. The explanation of the first embodiment is incorporated in the description of the receiver 300. The sizes and the forms of the left inflow port 311 and the right inflow port 312 formed in the upper surface 310 of the receiver 300 are determined based on the design principle described in the above-described embodiments.

The servo-valve 100A includes a torque motor 400A. The torque motor 400A corresponds to the driving unit 400 described with reference to FIG. 1. The explanation of the driving unit 400 is incorporated in the description of the torque motor 400A.

The torque motor 400A includes a lower coil 411, an upper coil 412, a lower magnetic piece 421, an upper magnetic piece 422, and a magnetic rod 430. The upper coil 412 is disposed above the lower coil 411. The lower magnetic piece 421 may be formed in a substantially cylindrical form. The lower coil 411 is accommodated inside the lower magnetic piece 421. Like the lower magnetic piece 421, the upper magnetic piece 422 may be formed in a substantially cylindrical form. The upper coil 412 is disposed inside the upper magnetic piece 422. The lower edge of the upper magnetic piece 422 faces the upper edge of the lower magnetic piece 421. The magnetic rod 430 extends substantially horizontally. The left and right ends of the magnetic rod 430 are located in a gap between the upper edge of the lower magnetic piece 421 and the lower edge of the upper magnetic piece 422.

A current is supplied to the lower coil 411 and the upper coil 412. As a result, the lower magnetic piece 421 and the upper magnetic piece 422 serve as magnets. When a current is supplied to the lower coil 411 and the upper coil 412 so that the right end of the magnetic rod 430 is pulled to the lower magnetic piece 421 and the left end of the magnetic rod 430 is pulled to the upper magnetic piece 422, the magnetic rod 430 rotates clockwise. When a current is supplied to the lower coil 411 and the upper coil 412 so that the left end of the magnetic rod 430 is pulled to the lower magnetic piece 421 and the right end of the magnetic rod 430 is pulled to the upper magnetic piece 422, the magnetic rod 430 rotates counterclockwise.

The servo-valve 100A includes a nozzle portion 200A. The nozzle portion 200A corresponds to the nozzle 200 described with reference to FIG. 1. The explanation of the nozzle 200 may be incorporated in the description of the nozzle portion 200A.

The nozzle portion 200A includes a nozzle piece 240, a flexible tube 250, and a coupling shaft 260. The flexible tube 250 extends vertically to penetrate the torque motor 400A. The nozzle piece 240 is attached to the lower end of the flexible tube 250. The high-pressure hydraulic fluid is supplied to the flexible tube 250. The hydraulic fluid is guided by the flexible tube 250 to reach the nozzle piece 240.

The nozzle piece 240 includes a lower surface 241 which faces the upper surface 310 of the receiver 300. The lower surface 241 is provided with a discharge port 242. The form and the size of the discharge port 242 are determined based on the design principle described in the above-described embodiments. The high-pressure hydraulic fluid which is supplied to the nozzle piece 240 is discharged from the discharge port 242. Subsequently, the hydraulic fluid flows into the receiver 300.

The coupling shaft 260 is used so that the flexible tube 250 is coupled to an intermediate portion of the magnetic rod 430. The flexible tube 250 and the nozzle piece 240 move left and right in a reciprocating manner in response to the clockwise and counterclockwise rotations of the magnetic rod 430. In the embodiment, the first position is exemplified by the position of the nozzle piece 240 moving left or right from the initial position (the position of the nozzle piece 240 in which the point of intersection between the upper surface 310 of the receiver 300 and the extended line extended from the center of the discharge port 242 in the hydraulic fluid discharge direction is located between the left inflow port 311 and the right inflow port 312). The second position is exemplified by the position of the nozzle piece 240 moving right or left from the initial position.

When the magnetic rod 430 rotates about the coupling shaft 260 clockwise, the nozzle piece 240 moves leftward. As a result, the area of overlapping between the discharge port 242 and the left inflow port 311 increases and the area of overlapping between the discharge port 242 and the right inflow port 312 decreases. In this case, the amount of the hydraulic fluid flowing into the left flow path 313 formed inside the receiver 300 exceeds the flow rate of the hydraulic fluid flowing into the right flow path 314.

When the magnetic rod 430 rotates about the coupling shaft 260 counterclockwise, the nozzle piece 240 moves rightward. As a result, the area of overlapping between the discharge port 242 and the right inflow port 312 increases and the area of overlapping between the discharge port 242 and the left inflow port 311 decreases. In this case, the amount of the hydraulic fluid flowing into the right flow path 314 formed inside the receiver 300 exceeds the flow rate of the hydraulic fluid flowing into the left flow path 313.

The servo-valve 100A includes a spool valve 700. The spool valve 700 includes a casing 710, a spool 720, and a cantilever spring 730. The spool 720 is disposed inside the casing 710. As a result, a flow path through which the hydraulic fluid flows is formed inside the casing 710. The cantilever spring 730 is used so that the casing 710 and the spool 720 are coupled to each other. The cantilever spring 730 applies a force of keeping the spool 720 at the closed position to the spool 720. When the spool 720 is located at the closed position, the spool valve 700 interrupts the hydraulic fluid supply path from the pumps 510 and 520 to the actuator 600. When the spool 720 moves leftward or rightward from the closed position, the spool valve 700 opens the hydraulic fluid supply path from the pumps 510 and 520 to the actuator 600.

The casing 710 is provided with seven ports 711 to 717. The port 711 is connected in fluid communication with the left outflow port 315 of the receiver 300. The port 712 is connected in fluid communication with the right outflow port 316 of the receiver 300. The pumps 510 and 520 are respectively attached to the ports 713 and 714. The ports 715 and 716 are connected in fluid communication with the actuator 600. The tank 530 is attached to the port 717.

The spool 720 includes four partition walls 721, 722, 723, and 724 and a coupling shaft 725 used so that the partition walls 721, 722, 723, and 724 are coupled to one another. The coupling shaft 725 extends substantially horizontally. The partition wall 721 is formed at the left end of the coupling shaft 725. The partition wall 722 is formed at the right end of the coupling shaft 725. The partition wall 723 is located between the partition walls 721 and 722. The partition wall 724 is located between the partition walls 722 and 723.

The partition walls 721, 722, 723, and 724 divide the inner space of the casing 710 into five chambers 741, 742, 743, 744, and 745. The chamber 741 moves to the leftmost side. The chamber 742 moves to the rightmost side. The chamber 743 is formed between the partition walls 721 and 723. The chamber 744 is formed between the partition walls 722 and 724. The chamber 745 is formed between the partition walls 723 and 724.

When the nozzle piece 240 moves leftward, the hydraulic fluid mainly flows from the discharge port 242 of the nozzle piece 240 to the left inflow port 311 of the receiver 300. Subsequently, the hydraulic fluid which flows into the left inflow port 311 flows into the chamber 741 through the left flow path 313 of the receiver 300, the left outflow port 315 of the receiver 300, and the port 711 of the spool valve 700. As a result, the inner pressure of the chamber 741 increases and the spool 720 moves rightward from the closed position. All this while, the hydraulic fluid which exists inside the chamber 742 is blown out from the right inflow port 312 through the port 712 of the spool valve 700, the right outflow port 316 of the receiver 300, and the right flow path 314 of the receiver 300. Subsequently, when the nozzle piece 240 returns to the initial position, the hydraulic fluid ejected from the discharge port 242 of the nozzle piece 240 flows in substantially the same quantity into the left inflow port 311 and the right inflow port 312 of the receiver 300. All this while, a force exerted on the left side of the spool 720 is larger than a force exerted on the right side of the spool 720 by a magnitude commensurate with the resilience of the cantilever spring 730. Thus, the spool 720 moves leftward and returns to the closed position.

When the nozzle piece 240 moves rightward, the hydraulic fluid mainly flows from the discharge port 242 of the nozzle piece 240 to the right inflow port 312 of the receiver 300. Subsequently, the hydraulic fluid which flows into the right inflow port 312 flows into the chamber 742 through the right flow path 314 of the receiver 300, the right outflow port 316 of the receiver 300, and the port 712 of the spool valve 700. As a result, the inner pressure of the chamber 742 increases and the spool 720 moves leftward from the closed position. All this while, the hydraulic fluid which exists inside the chamber 741 is blown out from the left inflow port 311 through the port 711 of the spool valve 700, the left outflow port 315 of the receiver 300, and the left flow path 313 of the receiver 300. Subsequently, when the nozzle piece 240 returns to the initial position, the hydraulic fluid which is ejected from the discharge port 242 of the nozzle piece 240 flows in substantially in the same quantity into the left inflow port 311 and the right inflow port 312 of the receiver 300. All this while, a force exerted on the right side of the spool 720 is larger than a force exerted on the left side of the spool 720 by a magnitude commensurate with the resilience of the cantilever spring 730. Thus, the spool 720 moves rightward and returns to the closed position.

When the spool 720 is located at the closed position, the partition wall 723 closes the port 715. At this time, the partition wall 724 closes the port 716. The pump 510 supplies the high-pressure hydraulic fluid to the chamber 743 through the port 713. The pump 520 supplies the high-pressure hydraulic fluid to the chamber 744 through the port 714. When the spool 720 moves rightward from the closed position, the hydraulic fluid supply path from the chamber 743 to the actuator 600 and the hydraulic fluid discharge path from the actuator 600 to the chamber 745 are opened. When the spool 720 moves leftward from the closed position, the hydraulic fluid supply path from the chamber 744 to the actuator 600 and the hydraulic fluid discharge path from the actuator 600 to the chamber 745 are opened. Thus, the amount of the hydraulic fluid flowing from the ports 715 and 716 to the actuator 600 is adjusted by the left and right movement of the nozzle piece 240. In the embodiment, the first outflow port is exemplified by one of the ports 715 and 716. The second outflow port is exemplified by the other of the ports 715 and 716.

The actuator 600 includes a casing 610 and a movable piece 620. The casing 610 is provided with two ports 611 and 612. The port 611 of the actuator 600 is connected in fluid communication with to the port 715 of the spool valve 700. The port 612 of the actuator 600 is connected in fluid communication with to the port 716 of the spool valve 700.

The movable piece 620 includes a partition wall 621 and a rod 622. The partition wall 621 divides the inner space of the casing 610 into a left chamber 631 and a right chamber 632. The port 611 is coupled to the left chamber 631. The port 612 is coupled to the right chamber 632. The rod 622 extends right from the partition wall 621 and protrudes to the outside of the casing 610. The rod 622 is connected to other external devices (not show) disposed outside the casing 610. In the embodiment, the hollow portion is exemplified by the inner space of the casing 610.

When the spool 720 moves rightward from the closed position, the hydraulic fluid which is supplied from the pump 510 to the chamber 743 through the port 713 flows into the left chamber 631 through the ports 715 and 611. Since the inner pressure of the left chamber 631 increases, the movable piece 620 moves rightward. All this while, the right chamber 632 communicates with the chamber 745 through the ports 612 and 716. The hydraulic fluid which exists inside the right chamber 632 is extruded from the right chamber 632 by the movable piece 620 moving right so that the hydraulic fluid flows to the chamber 745. Subsequently, the hydraulic fluid which flows into the chamber 745 is stored in the tank 530.

When the spool 720 moves leftward from the closed position, the hydraulic fluid which is supplied from the pump 520 to the chamber 744 through the port 714 flows into the right chamber 632 through the ports 716 and 612. Since the inner pressure of the right chamber 632 increases, the movable piece 620 moves leftward. All this while, the left chamber 631 communicates with the chamber 745 through the ports 611 and 715. The hydraulic fluid which exists inside the left chamber 631 is extruded from the left chamber 631 by the movable piece 620 moving left so that the hydraulic fluid flows into the chamber 745. Subsequently, the hydraulic fluid which flows into the chamber 745 is stored in the tank 530.

In FIG. 8, the receiver 300 is drawn separately from the casing 710 of the spool valve 700. However, the receiver 300 may be integrated with the casing 710 of the spool valve 700.

In the embodiment, the cantilever spring 730 is coupled to the spool 720 and the casing 710. Instead of the cantilever spring 730, an elastic member coupling the spool 720 and the nozzle portion 200A to each other may be used.

In the embodiment, the actuator 600 is coupled to the spool valve 700. However, the actuator 600 may be directly coupled to the receiver 300.

Seventh Embodiment

Based on the design principle described in the above-described embodiments, a designer can give various forms to the discharge port and the inflow port. In a seventh embodiment, various forms of the discharge port and the inflow port will be described. The form described in the seventh embodiment is illustrative. The designer can use other forms as the forms of the discharge port and the inflow port. Thus, the principle of the seventh embodiment is not limited in accordance with the forms below.

FIGS. 9A to 9E are schematic diagrams of various forms of the discharge port and the inflow port. Referring to FIGS. 9A to 9E, various forms of the discharge port and the inflow port will be described.

The sections (a) to (d) of FIG. 9A show the circular discharge port. The left inflow port and the right inflow port shown in the section (a) of FIG. 9A are semi-circular. The left inflow port and the right inflow port shown in the section (b) of FIG. 9A are rectangular. The left inflow port and the right inflow port shown in the section (c) of FIG. 9A are trapezoidal. The left inflow port and the right inflow port shown in the section (d) of FIG. 9A are octagonal.

The sections (a) to (d) of FIG. 9B show the elliptical discharge port. The left inflow port and the right inflow port shown in the section (a) of FIG. 9B are semi-circular. The left inflow port and the right inflow port shown in the section (b) of FIG. 9B are rectangular. The left inflow port and the right inflow port shown in the section (c) of FIG. 9B are trapezoidal. The left inflow port and the right inflow port shown in the section (d) of FIG. 9B are octagonal.

The sections (a) to (d) of FIG. 9C show the rectangular discharge port. The left inflow port and the right inflow port shown in the section (a) of FIG. 9C are semi-circular. The left inflow port and the right inflow port shown in the section (b) of FIG. 9C are rectangular. The left inflow port and the right inflow port shown in the section (c) of FIG. 9C are trapezoidal. The left inflow port and the right inflow port shown in the section (d) of FIG. 9C are octagonal.

Figure 9E:
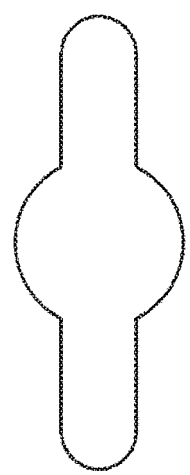
FIG. 9E is a schematic diagram showing the illustrative forms of the discharge port and the inflow port (a seventh embodiment).

The sections (a) and (b) of FIG. 9D show the rectangular discharge port. The left inflow port and the right inflow port shown in the section (a) of FIG. 9D are elliptical. The left inflow port and the right inflow port shown in the section (b) of FIG. 9D are circular. The discharge port, the left inflow port, and the right inflow port shown in the section (c) of FIG. 9D are elliptical. As shown in FIG. 9E, an uneven form may be given to the discharge port, the left inflow port, and/or the right inflow port.

Figure 10:
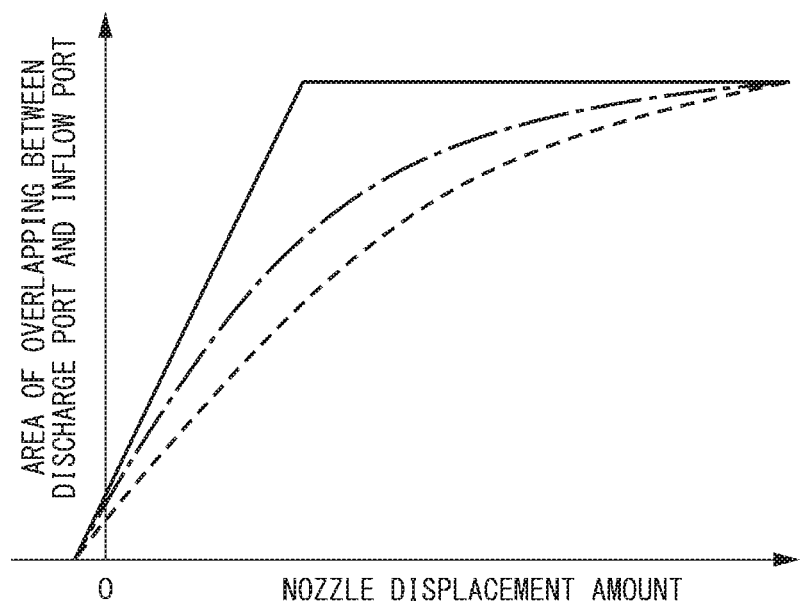
FIG. 10 is a diagram showing a change in area of overlapping of the discharge port and the inflow port with respect to a nozzle displacement amount.

As above, the embodiments of the invention have been described. According to the embodiment, at least one of the discharge port of the nozzle and the inflow port of the receiver is formed in a non-circular form such that an amount of change in the area of overlapping of the discharge port and the inflow port occurring when the nozzle is displaced from the initial position is larger compared to a case of a circular form in the same area. FIG. 10 is a diagram illustrating a relation of a change amount of the area of overlapping between the discharge port and the inflow port with respect to the nozzle displacement amount. The amount of displacement at the initial position of the nozzle is defined to be 0. A case in which the discharge port and the inflow port are formed in a circular form is indicated by a dashed line. Further, a case in which at least one of the discharge port and the inflow port is formed in an elliptical form is indicated by the one-dotted chain line and a case in which at least one of the discharge port and the inflow port is formed in a rectangular form is indicated by a solid line. According to the embodiment, since a change amount of the area of overlapping with respect to the nozzle displacement amount increases compared to a case in which the discharge port and the inflow port are formed in a circular form, the fluid can flow into the inflow port in a short time. Accordingly, the response speed of the actuator is improved.

The design principle described in various embodiments can be applied to various servo-valves and fluidic devices. A part of various features described in one of various embodiments may be applied to the servo-valve and the fluidic device according to another embodiment.

The discharge port and the inflow port each having the non-circular form are formed by, for example, electric discharge machining. However, the designer can determine a method of forming the discharge port and the inflow port to be suitable for the forms of the discharge port and the inflow port. Thus, the principle of the embodiment is not limited to a specific forming technique for forming the non-circular discharge port and the non-circular inflow port and may use, for example, an AM (additive manufacturing) technique or the like.

An aspect of the invention is as below. A servo-valve according to an aspect of the invention controls a fluid discharged from a discharge port of a nozzle by displacing the nozzle and drives an actuator. The servo-valve includes a receiver provided with an inflow port into which the fluid discharged from the discharge port flows. At least one of the discharge port and the inflow port is an opening formed in a non-circular form such that the amount of change in the area of overlapping of the discharge port and the inflow port occurring when the nozzle is displaced from the initial position is larger than when the discharge port and the inflow port are formed in circular forms of the same area.

According to the above-described configuration, the change amount of the area of overlapping between the discharge port and the inflow port occurring when the nozzle is displaced from the initial position becomes larger than that of the case in which the opening is formed in the circular form in the same area. Accordingly, since the fluid can flow into the inflow port in a short time, the response speed of the actuator is improved.

In the above-described configuration, a width dimension of the opening in the nozzle displacement direction may be smaller than a diameter of the virtual circle in the same area as that of the opening.

According to the above-described configuration, the change amount of the area of overlapping between the discharge port and the inflow port with respect to the nozzle displacement amount increases. Accordingly, since the fluid can flow into the inflow port in a short time, the response speed of the actuator can be improved.

In the above-described configuration, when the nozzle is located at the initial position, a curvature of the outline of the opening in the area of overlapping between the discharge port and the inflow port may be smaller than a curvature of a virtual circle in the same area as that of the opening.

Since the curvature of the outline of the opening in the area of overlapping between the discharge port and the inflow port is smaller than the curvature of the virtual circle when the nozzle is located at the initial position, an increase rate of the area of overlapping between the discharge port and the inflow port increases when the nozzle is displaced by a short distance from the initial position. Since the servo-valve can allow the fluid to flow into the inflow port in a short time, the servo-valve can promptly drive the actuator.

In the above-described configuration, the opening may be formed such that a length dimension in a direction orthogonal to the nozzle displacement direction and the fluid discharge direction from the discharge port of the nozzle at the initial position is larger than a width dimension in the nozzle displacement direction.

According to the above-described configuration, since the opening has the length dimension larger than the width dimension in the direction orthogonal to the nozzle displacement direction and the fluid discharge direction from the discharge port of the nozzle at the initial position, the area of overlapping between the discharge port and the inflow port greatly increases when the nozzle is displaced by a short distance. Since the servo-valve can allow the fluid to flow into the inflow port in a short time, the servo-valve can promptly drive the actuator.

In the above-described configuration, an area of the inflow port may be larger than an area of the discharge port.

According to the above-described configuration, since the area of the inflow port is larger than the area of the discharge port, the fluid discharged from the discharge port can easily flow into the inflow port. Thus, the servo-valve can promptly drive the actuator by efficiently using the fluid.

In the above-described configuration, a length dimension of the inflow port may be larger than a length dimension of the discharge port.

According to the above-described configuration, since the length dimension of the inflow port is larger than that of the discharge port, the fluid discharged from the discharge port can easily flow into the inflow port. Thus, the servo-valve can promptly drive the actuator by efficiently using the fluid.

In the above-described configuration, the inflow port may be formed in a rectangular form having a pair of short sides extended in the nozzle displacement direction. The discharge port may be formed in a rectangular form having a pair of shorts sides extended in the nozzle displacement direction. A gap between the pair of short sides of the inflow port may be wider than a gap between the pair of short sides of the discharge port.

According to the above-described configuration, since the gap between the pair of short sides of the inflow port is wider than the gap between the pair of short sides of the discharge port, the fluid discharged from the discharge port can easily flow into the inflow port. Thus, the servo-valve can promptly drive the actuator by efficiently using the fluid.

In the above-described configuration, the discharge port may be formed in a non-circular form. The area of the inflow port may be smaller than the area of the circumscribed circle of the discharge port.

According to the above-described configuration, since the area of the inflow port is smaller than the area of the circumscribed circle of the discharge port, a pressure of the fluid inside the servo-valve increases. Thus, the servo-valve can promptly drive the actuator by using the high fluid pressure.

In the above-described configuration, the discharge port may be formed in a non-circular form. The area of the inflow port may be larger than the area of the circumscribed circle of the inflow port.

According to the above-described configuration, since the area of the inflow port is larger than the area of the circumscribed circle of the discharge port, the fluid discharged from the discharge port can easily flow into the inflow port. Thus, the servo-valve can promptly drive the actuator by efficiently using the fluid.

In the above-described configuration, the distance between an extended line extended from the center of the discharge port of the nozzle at the initial position in the direction of discharge and the outline of the inflow port in the area of overlapping of the discharge port and the inflow port may be smaller than the distance between the extended line to the arc of a virtual circle concentric with the discharge port and having the same area as the inflow port in the area of overlapping.

According to the above-described configuration, since the distance from the extended line extended from the center of the discharge port of the nozzle at the initial position in the discharge direction to the outline drawing the outline of the inflow port in the area of overlapping is smaller than the distance from the extended line to the arc of the virtual circle, a high fluid area of the fluid discharged from the discharge port enters the inflow port in response to the short displacement of the nozzle. Thus, the servo-valve can promptly drive the actuator by efficiently using the fluid.

In the above-described configuration, a driving unit that displaces the nozzle may be further provided and the inflow port may include a first inflow port and a second inflow port aligned in the nozzle displacement direction. The driving unit may move the nozzle in a reciprocating manner between a first position in which the amount of the fluid flowing into the first inflow port exceeds the amount of the fluid flowing into the second inflow port and a second position in which the amount of the fluid flowing into the second inflow port exceeds the amount of the fluid flowing into the first inflow port. The first inflow port and the second inflow port may have the same form and size.

According to the above-described configuration, since the first inflow port and the second inflow port have the same form and size, the fluid can efficiently flow into the first inflow port or the second inflow port in response to the reciprocating movement of the nozzle. Thus, the servo-valve can promptly drive the actuator by efficiently using the fluid.

In the above-described configuration, when the nozzle is located at the initial position, an extended line extended from the center of the discharge port of the nozzle in the fluid discharge direction may pass through a midpoint between the first inflow port and the second inflow port.

According to the above-described configuration, since the extended line extended from the center of the discharge port of the nozzle at the initial position in the discharge direction passes through the midpoint between the first inflow port and the second inflow port, the fluid discharged from the nozzle at the initial position can flow in substantially in the same quantity into the first inflow port and the second inflow port. Thus, the designer can design an actuator control using the servo-valve by using the initial position as a reference position.

In the above-described configuration, the extended line may intersect a straight line connecting the center of the first inflow port and the center of the second inflow port at a point P. The second inflow port may have a mirror image relation with respect to the first inflow port in a virtual plane enclosing a straight line passing through the point P and extended in a direction orthogonal to the nozzle displacement direction and the extended line.

According to the above-described configuration, since the second inflow port has a mirror image relation with respect to the first inflow port in the virtual plane enclosing the line passing through the point P and extended in a second direction and the extended line, the fluid discharged from the nozzle at the initial position can flow in substantially in the same quantity into the first inflow port and the second inflow port. Thus, the designer can design a control using the servo-valve by using the initial position as a reference position.

In the above-described configuration, the servo-valve may further include a casing provided with a flow path through which the fluid flows. The casing may be provided with a first outflow port and a second outflow port. The driving unit may displace the nozzle between the first position and the second position to adjust the amount of the fluid flowing out of the first outflow port and the amount of the fluid flowing out of the second outflow port.

According to the above-described configuration, since the driving unit displaces the nozzle between the first position and the second position to adjust the amount of the fluid flowing out of the first outflow port and the amount of the fluid flowing out of the second outflow port, the designer can operate a device connected to the servo-valve by changing a ratio of the outflow amounts from the first outflow port and the second outflow port.

In the above-described configuration, the opening may be selected from a group including an elliptical form, a polygonal form, and a form formed by an outline including a straight line and a curve.

According to the above-described configuration, since the opening is selected from a group including an elliptical form, a polygonal form, and a form formed by an outline including a straight line and a curve, the designer who designs the servo-valve can determine the form of the opening in accordance with various conditions necessary for the servo-valve.

A fluidic device according to another aspect of the invention includes the above-described servo-valve and a movable piece that is displaced by the fluid flowing through the servo-valve.

According to the above-described configuration, the fluidic device including the servo-valve can be operated at a high response speed.

The principle of the embodiments is very suitable for various devices obtaining a driving force from a fluid.

What is claimed is:

1. A servo-valve that controls a fluid discharged from a discharge port of a nozzle by displacing the nozzle and drives an actuator, the servo-valve comprising:
a receiver that is provided with an inflow port into which the fluid discharged from the discharge port flows, wherein at least one of the discharge port and the inflow port is an opening formed in a non-circular form such that an amount of change in an area of overlapping of the discharge port and the inflow port occurring when the nozzle is displaced from an initial position is larger than an amount of change in the area of overlapping of the discharge port and the inflow port occurring if the discharge port and the inflow port were formed in circular forms having the same area as that of the non-circular form;
wherein the discharge port is formed in a non-circular form, and an area of the inflow port is smaller than an area of a circumscribed circle of the discharge port.

2. The servo-valve according to claim 1, wherein a width dimension of the opening in the nozzle displacement direction is smaller than a diameter of the circular form having the same area as that of the opening.

3. The servo-valve according to claim 1, wherein when the nozzle is located at the initial position, a curvature of an outline of the opening within an area of overlapping between the discharge port and the inflow port is smaller than a curvature of the circular form in the same area as that of the opening.

4. The servo-valve according to claim 1, wherein the opening is formed such that a length dimension in a direction orthogonal to the nozzle displacement direction and a discharge direction of the fluid from the discharge port of the nozzle at the initial position is larger than a width dimension in the nozzle displacement direction.

5. The servo-valve according to claim 1, wherein an area of the inflow port is larger than an area of the discharge port.

6. The servo-valve according to claim 4, wherein a length dimension of the inflow port is larger than a length dimension of the discharge port.

7. The servo-valve according to claim 6, wherein the opening of the inflow port is formed in a rectangular form having a pair of short sides extended in the nozzle displacement direction, wherein the opening of the discharge port is formed in a rectangular form having a pair of short sides extended in the nozzle displacement direction, and wherein a gap between the pair of short sides of the inflow port is wider than a gap between the pair of short sides of the discharge port.

8. The servo-valve according to claim 1, wherein the discharge port is formed in a non-circular form, and wherein an area of the inflow port is smaller than an area of a circumscribed circle of the discharge port which meets corners of the non-circular form in a plan view.

9. The servo-valve according to claim 1, wherein the discharge port is formed in a non-circular form, and wherein an area of the inflow port is larger than an area of a circumscribed circle of the discharge port which meets corners of the non-circular form in a plan view.

10. The servo-valve according to claim 1, wherein a first direction is an axial direction of the nozzle when the nozzle is at the initial position;
a distance in a second direction perpendicular to the first direction from a center of the discharge port to a closest edge of the inflow port is smaller than a distance from the center of the discharge port to a closest edge of a virtual circle concentric with the inflow port;
wherein an area of the virtual circle is equal to an area of the inflow port.

11. The servo-valve according to claim 1, further comprising: a driving unit that displaces the nozzle; wherein the inflow port includes a first inflow port and a second inflow port aligned in the nozzle displacement direction, wherein the driving unit moves the nozzle in a reciprocating manner between a first position in which the amount of the fluid flowing into the first inflow port exceeds the amount of the fluid flowing into the second inflow port and a second position in which the amount of the fluid flowing into the second inflow port exceeds the amount of the fluid flowing into the first inflow port, and wherein the first inflow port and the second inflow port have the same form and size.

12. The servo-valve according to claim 11, wherein when the nozzle is located at the initial position, an extended line extended from the center of the discharge port of the nozzle in the fluid discharge direction passes through a midpoint between the first inflow port and the second inflow port.

13. The servo-valve according to claim 12, wherein the extended line intersects a straight line connecting the center of the first inflow port and the center of the second inflow port at a point (P), and wherein the second inflow port has a mirror image relation with respect to the first inflow port in a virtual plane defined by a straight line passing through the point (P) and extended in a direction orthogonal to the nozzle displacement direction and defined by the extended line.

14. The servo-valve according to claim 11, further comprising: a casing that is provided with a flow path through which the fluid flows, wherein the casing is provided with a first outflow port and a second outflow port, and wherein the driving unit displaces the nozzle between the first position and the second position to adjust the amount of the fluid flowing out of the first outflow port and the amount of the fluid flowing out of the second outflow port.

15. The servo-valve according to claim 1, wherein the opening is selected from a group including an elliptical form, a polygonal form, and a form formed by an outline including a straight line and a curve.

16. A fluidic device comprising: the servo-valve according to claim 1; and a movable piece that is displaced by a fluid flowing through the servo-valve.

* * * * *